(12) United States Patent
Okino

(10) Patent No.: US 7,052,123 B2
(45) Date of Patent: May 30, 2006

(54) INK JET IMAGE RECORDING METHOD AND APPARATUS USING THE METHOD

(75) Inventor: Yoshiharu Okino, Fujinomiya (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/365,444

(22) Filed: Feb. 13, 2003

(65) Prior Publication Data

US 2003/0227526 A1 Dec. 11, 2003

(30) Foreign Application Priority Data

| Feb. 13, 2002 | (JP) | ............................... 2002-035381 |
| Feb. 13, 2002 | (JP) | ............................... 2002-035382 |
| Feb. 13, 2002 | (JP) | ............................... 2002-035419 |
| Feb. 13, 2002 | (JP) | ............................... 2002-035420 |
| Feb. 13, 2002 | (JP) | ............................... 2002-035421 |
| Feb. 13, 2002 | (JP) | ............................... 2002-035473 |

(51) Int. Cl.
*B41J 2/01* (2006.01)

(52) U.S. Cl. ............................... 347/100; 347/95; 347/9

(58) Field of Classification Search .................... 347/9, 347/10, 15, 100, 95, 96, 101; 523/160; 106/31.13, 106/31.27, 31.6

See application file for complete search history.

(56) References Cited

U.S. PATENT DOCUMENTS 4,101,541 A * 7/1978 Petitpierre et al. .......... 534/769
4,914,562 A * 4/1990 Abe et al. ..................... 347/63
6,154,228 A * 11/2000 Okuda et al. ................. 347/15
6,193,345 B1 * 2/2001 Feinn et al. ................... 347/12

FOREIGN PATENT DOCUMENTS

JP 2002-225250 8/2002

OTHER PUBLICATIONS

Pyrimidines. XXXII. Synthesis and Properties of Pyrido [2, 3-d] pyrimidine-2, 4-diones (5-deazalumazines), Pfleiderer, M and Pfleiderer, W.*

* cited by examiner

*Primary Examiner*—Manish S. Shah
(74) *Attorney, Agent, or Firm*—Young & Thompson

(57) ABSTRACT

An ink jet image recording method including hitting an ink composition for ink jet recording on a recording material in a hitting volume of 0.1 to 100 pl at an ejection frequency of 1 KHz or more and/or at an average hitting speed of 2 m/sec or more, the ink composition including an aqueous medium having dissolved therein at least one water-soluble dye represented by the following formula (1):

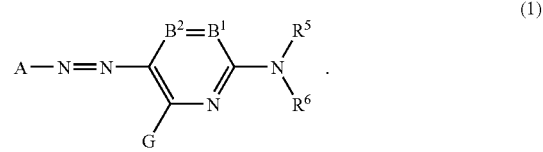

(1)

7 Claims, 3 Drawing Sheets

INK JET IMAGE RECORDING METHOD AND APPARATUS USING THE METHOD

FIELD OF THE INVENTION

The present invention relates to an ink jet (image) recording method where an ink composition for ink jet recording ensuring excellent image preservability such as water resistance and weather resistance and excellent ejection stability is used and a high-density image having high image quality and excellent preservability can be recorded at a high speed, and also relates to an ink jet (image) recording apparatus using the recording method.

BACKGROUND OF THE INVENTION

Accompanying recent popularization of computers, an ink jet printer is widely used for printing letters or an image on paper, film, cloth or the like not only at offices but also at homes.

The ink jet recording method includes a system of jetting out a liquid droplet by applying a pressure using a piezo element, a system of jetting out a liquid droplet by generating bubbles in an ink under heat, a system of using an ultrasonic wave, and a system of jetting out a liquid droplet by suction using an electrostatic force. The ink used for such ink jet recording includes an aqueous ink, an oily ink and a solid (fusion-type) ink. Among these inks, the aqueous ink is predominating in view of production, handleability, odor, safety and the like.

The coloring agent used in such an ink for ink jet recording is required to have high solubility in a solvent, enable high-density recording, provide good color, exhibit excellent fastness to light, heat, air, ozone, water and chemicals, ensure good fixing property to an image-receiving material and less blurring, give an ink having excellent storability, have high purity and no toxicity, and be available at a low cost. However, it is very difficult to find out a coloring agent satisfying these requirements in a high level. In particular, a coloring agent having good magenta or cyan color and excellent fastness to light and ozone is strongly demanded.

Various dyes and pigments for ink jet recording have been already proposed and actually used, however, a coloring agent satisfying all requirements is not yet found out at present. Conventionally well-known dyes and pigments having a color index (C.I.) number can hardly satisfy both color and fastness required of the ink for ink jet recording.

On the other hand, in the case of printing a high-quality image such as photograph by the ink jet recording method, when the hitting volume is increased, the image can be printed at a high speed without impairing the reproducibility of high density, however, this has a problem that the image is poor in the smoothness, that is, the roughness is outstanding. The roughness of image is reduced by decreasing the hitting volume, however, this is accompanied with a problem that the high-speed printing with good reproducibility of high density cannot be attained.

Furthermore, in the case of printing a high-quality image such as photograph in a high productivity by the ink jet recording, the image must be recorded on a recording paper in a high density and at the same time, printed at a high speed. However, with an ink in a low concentration, a large number of ink droplets must be hit and if the ink is hit at a low frequency, the recording time is prolonged and the productivity disadvantageously decreases.

For solving this problem, a method of hitting the ink using a printer head having a large number of nozzles is proposed, however, due to the limitation of the driving electric power or effect of the heat generated in the printer head on the image, the number of head nozzles which can be simultaneously driven is limited. Actually, in the case of a type where the recording is performed by moving a recording material and a printer head in the directions orthogonal to each other, the number of printer heads which can be simultaneously driven is from a few tens to about 200 and even in the case of a type called line head where the head is fixed, a few hundreds. A printer head capable of recording an image in a high density at a high speed is being demanded.

On recording an image using the above-described ink, the hitting speed at hitting an ink from a nozzle seriously affects the quality of image recorded. If the hitting speed is low, the positions of ink droplets landed on the recording material disperse and this causes problems. That is, in the case of recording an image with one color, indentation called jaggy is generated in the line part and in the case of recording a gradation image using multiple colors, the recorded image may be unevenly tinged or the image may lack in the smoothness and may be roughened.

When the hitting speed is high, these problems scarcely occur but in the case of a low-concentration ink, a large number of ink droplets must be hit to give a predetermined density and therefore, even if the hitting speed is high, the recording disadvantageously takes a long time as compared with a high-concentration ink.

SUMMARY OF THE INVENTION

An object of the present invention is to provide an ink jet image recording method and an image recording apparatus, where an image with less roughness and less unevenness can be recorded in a high density at a high speed.

This object of the present invention can be attained by the following ink jet image recording method and ink jet image recording apparatus.

1) An ink jet image recording method comprising hitting an ink composition for ink jet recording on a recording material in a hitting volume of 0.1 to 100 pl (preferably from 0.5 to 50 pl) at an ejection frequency of 1 KHz or more and/or at an average hitting speed of 2 m/sec or more (preferably 5 m/sec or more), the ink composition comprising an aqueous medium having dissolved and/or dispersed therein at least one dye represented by the following formula (1):

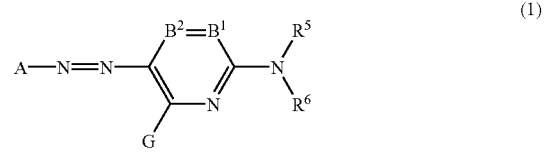

wherein A represents a 5-membered heterocyclic group; $B^1$ and $B^2$ each represents $=CR^1-$ or $-CR^2=$ or either one of $B^1$ and $B^2$ represents a nitrogen atom and the other represents $=CR^1-$ or $-CR^2=$; $R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted; G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

2) An ink jet image recording apparatus using the ink jet image recording method described in 1).

3) The ink jet image recording method as described in 1), wherein the image-receiving material is an image-receiving material comprising a support having thereon an image-receiving layer containing a white inorganic pigment particle.

4) The ink jet image recording method as described in 1), wherein when an image is recorded by mixing ink droplets having a plurality of hitting volumes, the ink droplet having a small hitting volume is jetted out at a higher hitting speed than the ink droplet having a large hitting volume.

5) An ink jet image recording method comprising hitting an ink for ink jet recording on a recording material in a hitting volume of 0.1 to 100 pl at a hitting frequency (ejection frequency) of 1 KHz or more and/or at an average hitting speed of 2 m/sec or more, the ink comprising an aqueous medium having dissolved or dispersed therein at least one dye represented by the following formula (I):

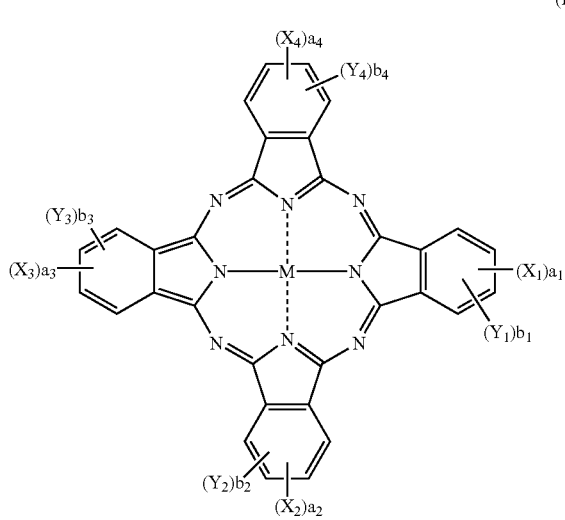

wherein $X_1$, $X_2$, $X_3$ and $X_4$ each independently represents —SO-Z, —SO$_2$Z, —SO$_2$NR$_1$R$_2$, a sulfo group, —CONR$_1$R$_2$ or —CO$_2$R$_1$; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; when a plurality of Zs are present, these may be the same or different; $Y_1$, $Y_2$, $Y_3$ and $Y_4$ each independently represents a monovalent substituent; when a plurality of $X_1$, $X_2$, $X_3$, $X_4$, $Y_1$, $Y_2$, $Y_3$ or $Y_4$ are present, these may be the same or different; $a_1$ to $a_4$ and $b_1$ to $b_4$ represent the number of substituents $X_1$ to $X_4$ and $Y_1$ to $Y_4$, respectively, $a_1$ to $a_4$ each is independently an integer of 0 to 4, provided that $a_1$ to $a_4$ all are not 0 at the same time, and $b_1$ to $b_4$ each is independently an integer of 0 to 4; and M represents a hydrogen atom, a metal atom or its oxide, hydroxide or halide.

6) An ink jet image recording apparatus using the ink jet image recording method described in 5).

As preferred embodiments, the present invention further includes the followings.

7) The ink jet image recording method as described in 5), wherein the dye represented by formula (I) is a dye represented by the following formula (II):

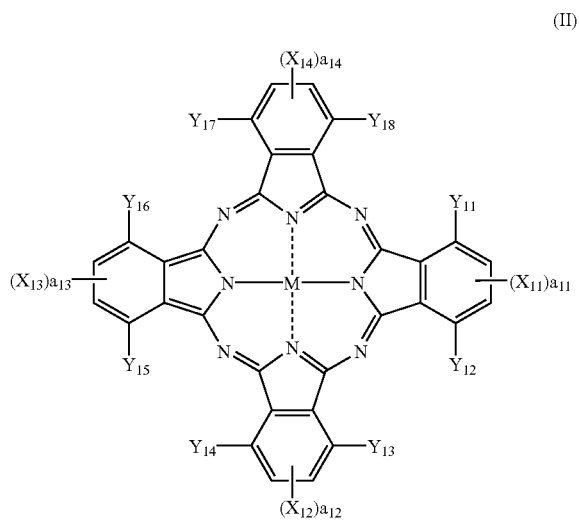

wherein $X_{11}$ to $X_{14}$, $Y_{11}$ to $Y_{18}$ and M have the same meanings as $X_1$ to $X_4$, $Y_1$ to $Y_4$ and M in formula (I), respectively; and $a_{11}$ to $a_{14}$ each independently represents an integer of 1 or 2.

8) The ink jet image recording method as described in 5), wherein the ink is hit according to recording signals on the image-receiving layer surface of a recording material having an image-receiving layer containing a white inorganic pigment fine particle.

9) The ink jet image recording method as described in 5), which is an ink jet image recording method of recording an image using a plurality of ink droplets different in the hitting volume, wherein the average hitting speed of the ink droplets in a small hitting volume is greater than the average hitting speed of the ink droplets in a large hitting volume.

DETAILED DESCRIPTION OF THE INVENTION

The present invention is described in detail below.

In the ink jet recording method of the present invention, an ink composition for ink jet recording comprising an aqueous medium having dissolved and/or dispersed therein at least one dye represented by formula (1) is hit on a recording material in a hitting volume of 0.1 to 500 pl, preferably from 0.1 to 100 pl, more preferably from 0.5 to 50 pl, still more preferably from 2 to 50 pl.

The present invention is not limited on the ink jet recording system and is used for a known system, for example, an electric charge controlling system of jetting out the ink by using the electrostatic induction force, a drop-on-demand system (pressure pulse system) of using an oscillation pressure of a piezo element, an acoustic ink jet system of converting electric signals into acoustic beams, irradiating the beams on the ink and jetting out the ink using the radiation pressure, and a thermal ink jet (bubble jet) system of heating the ink to form bubbles and utilizing the generated pressure.

The ink jet recording system includes a system of ejecting a large number of small-volume ink droplets of so-called photo ink having a low concentration, a system of improving the image quality by using a plurality of inks substantially the same in the color but different in the concentration, and a system using a colorless transparent ink.

Figure 1:
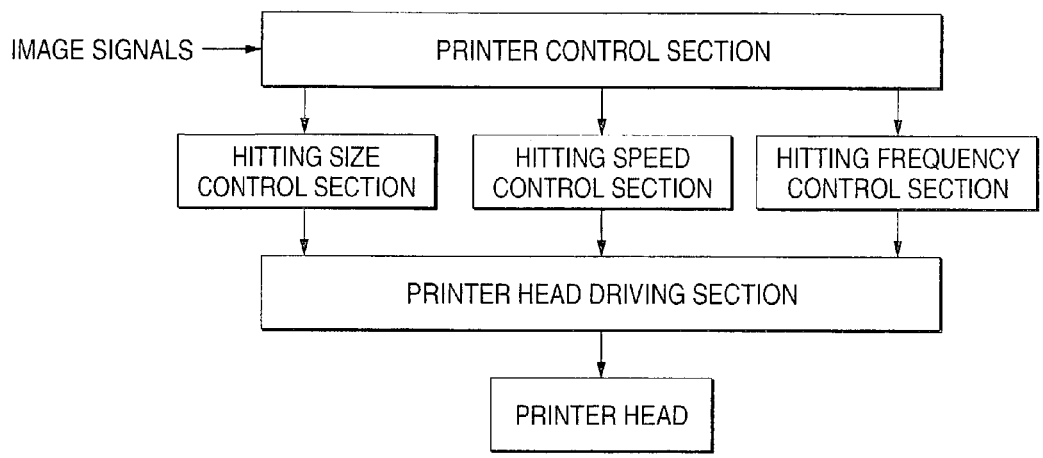
FIG. 1 is a block diagram of an ink jet printer.

FIG. 1 is a block diagram of a general ink jet printer. When signals of an image to be printed are input in a printer control section, the hitting size, hitting speed and hitting frequency (ejection frequency) are determined in the printer control section and signals for operating the hitting size, hitting speed and hitting frequency are prepared in respective control sections, thereby preparing signals for driving a printer head. The driving signals are fed from the printer head-driving section and according to the driving signals, the printer head hits ink to print an image. The driving system of the printer head according to the driving signals varies depending on the recording system of the printer, however, the hitting volume of ink, which is a characteristic feature of the present invention, is controlled mainly by the printer head.

For example, in the case of a thermal ink jet system, the hitting volume can be controlled by the structure of the printer head. That is, the ink can be hit in a desired size by changing the ink chamber, heating section and nozzle size. Also, even in the thermal ink jet system, the ink can be hit in a plurality of sizes by providing a plurality of printer heads different in the heating section or nozzle size.

In the case of a drop-on-demand system using a piezo element, the hitting volume can be changed by the structure of printer head similarly to the thermal ink jet system, however, by controlling the waveform of driving signals for driving the piezo element, the ink can be hit in a plurality of sizes using a printer head having the same structure as described below.

The driving of a printer head by a drop-on-demand system using a piezo element is described in more detail.

As shown in FIG. 2(a), a piezo element is disposed in the position contacting with the ink path for guiding an ink to the nozzle plate. The piezo element is, as well known, an element using a phenomenon that the crystal structure is distorted upon application of a voltage. This element has a very rapid response property. As shown in FIG. 2(b), when a voltage (driving signal) is applied, the piezo element is elongated during the time of application and deforms the side wall of the ink path. As a result thereof, the volume of the ink path is shrunk according to the elongation of the piezo element and the ink corresponding to this shrunk portion is ejected as an ink droplet from the nozzle (FIG. 2(c)). The elongation size of the piezo element varies depending on the amplitude (voltage) of the driving signal waveform and therefore, the hitting size of ink can be determined by the waveform and amplitude of the driving signal.

Figure 3:
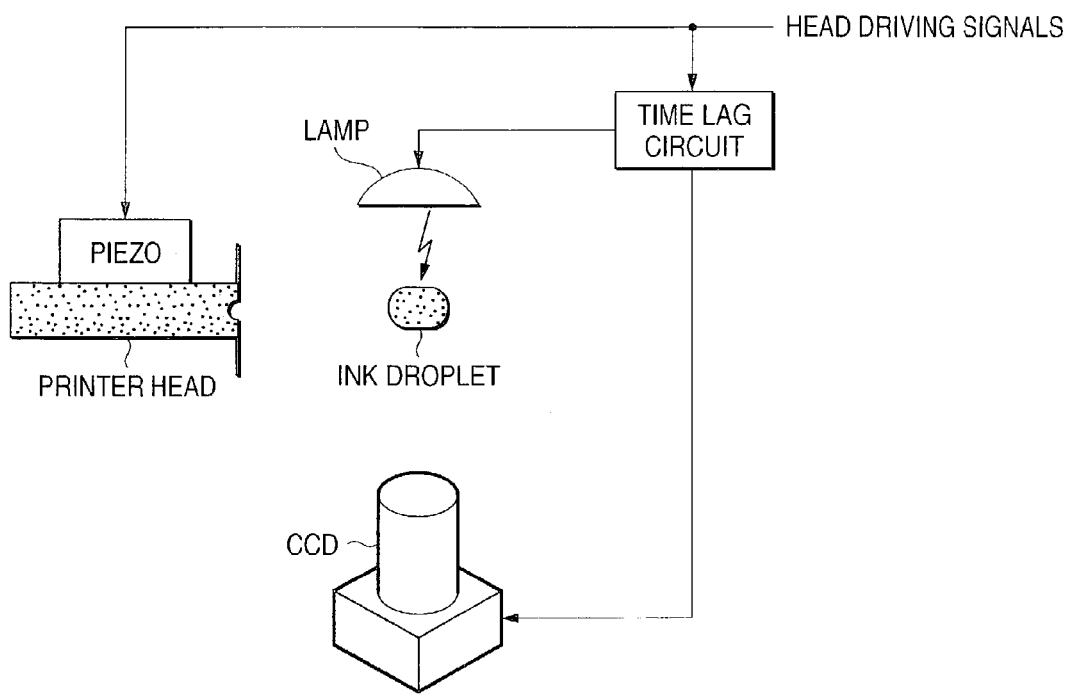
FIG. 3 is a schematic view showing the means for measuring the average hitting speed and hitting volume of ink droplet.
Figure 4:
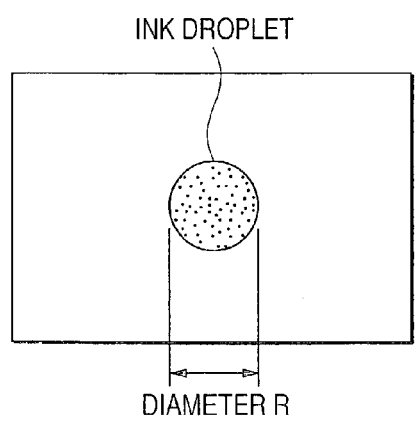
FIG. 4 is a view showing an image of ink droplet photographed by CCD camera.

The ink droplet size can be measured, for example, by the system shown in FIG. 3. A printer head is driven by the head-driving signals for hitting the ink. At the same time, a circuit for generating a predetermined time lag is adjusted, a flying ink droplet is illuminated by a lamp for a short time, and an enlarged photograph thereof is taken by a CCD camera at a predetermined magnification. FIG. 4 shows an image photographed and on this photographed image, the diameter R of the ink droplet can be determined. From the value obtained, the volume V can be determined according to the following formula:

$$V = \frac{4}{3}\pi\left(\frac{R}{2}\right)^3 \div 1000$$

The first embodiment of the ink jet (image) recording method of the present invention is described below.

In the ink jet recording method of the present invention, an ink composition for ink jet recording comprising an aqueous medium having dissolved and/or dispersed therein at least one dye represented by formula (1) is hit on a recording material at an ejection frequency (hitting frequency) of 1 KHz or more.

In order to record a high-quality image like a photograph, the hitting density must be 600 dpi (number of dots per inch) or more so that an image having high sharpness can be reproduced by small ink droplets.

In the case of recording an image using an ink having a low concentration, a high-density image must be obtained by repeatedly hitting the ink at a high density and therefore, the recording time is prolonged.

The ink for use in the present invention is characterized by having a high $\epsilon$, namely, a high concentration and therefore, a high-density recording can be attained even with the same hitting size.

A same image was recorded using this ink or a commercially available ink (ink for PM950, produced by Epson) by hitting each ink on a recording paper at 600 dpi based on the same image signals and the density in a specific portion was compared, as a result, the density was 1.3 in the case of ink for use in the present invention and 1.0 in the case of the commercially available ink.

As such, the ink for use in the present invention can attain high-density recording with an ink droplet having the same volume and therefore, a sufficiently high density as a photograph can be obtained by once hitting at a recording density of 600 dpi.

In hitting an ink by a head having a plurality of nozzles, the number of heads which can be driven at the same time is restricted, that is, from a few tens to about 200 in the case of a type where a recording paper and a head are moved in the directions orthogonal to each other, and a few hundreds even in the case of a type called line head where the head is fixed. This is because the driving electric power is limited or due to the effect of heat generated in the head on the image, a large number of head nozzles cannot be simultaneously driven.

Furthermore, in the ink jet recording method of the present invention, an ink composition for ink jet recording comprising an aqueous medium having dissolved and/or dispersed therein at least one dye represented by formula (1) is hit on a recording material at an average hitting speed of 2 m/sec or more, preferably 5 m/sec or more. At this time, the hitting volume is preferably from 0.1 to 500 pl. The term "average hitting speed" as used herein means a speed obtained by dividing a distance from a nozzle face to a recording paper by the time after the leading end of an ink droplet starts jetting out from the nozzle face until it lands on the recording paper.

The hitting speed as a characteristic feature of the present invention is controlled by controlling the shape and amplitude of the waveform for driving the head.

Furthermore, by using a plurality of driving waveforms and selecting an appropriate waveform, the ink composition can be hit in a plurality of sizes with the same head.

Figure 2:
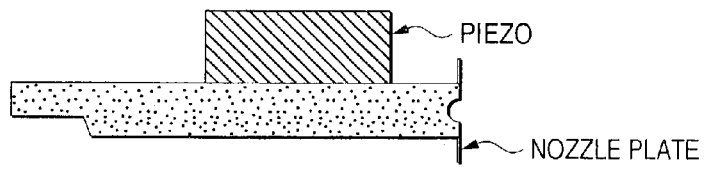
FIG. 2 (2(a), 2(b) and 2(c)) is a view showing the state where an ink droplet is jetted out due to elongation of piezo element.
Figure 2:
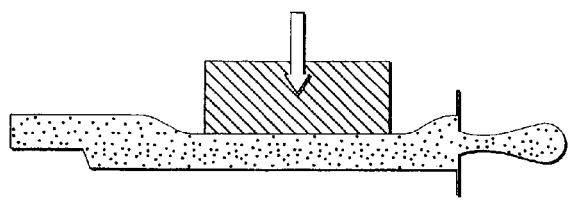
Figure 2:
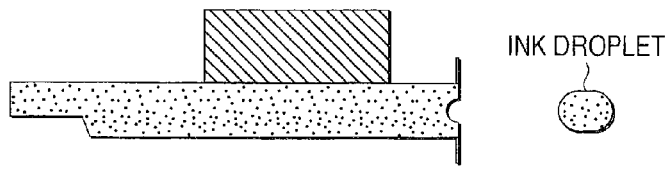

The driving of the piezo head is described below. As shown in FIG. 1, based on signals of an image to be printed, the hitting size, hitting speed and hitting frequency are determined in the printer control section and the signals for driving a printer head are prepared. The driving signals are fed to the printer head. As shown in FIG. 2, the hitting size, hitting speed and hitting frequency are controlled by the signals for driving the piezo. The hitting size and hitting speed are determined by the shape and amplitude of the driving waveform, and the frequency is determined by the cycle period of signals. By increasing the driving frequency, the recording speed can be increased.

As shown in Examples, when 500 nozzles of a 89 mm-width head having about 2,000 nozzles are simultaneously driven for printing an L-size print of a photograph in a high productivity, the one-line four-time driving must be repeated to a 3,000-line portion for printing a length of 127 mm and when the head is driven at 1 KHz, printing of one sheet takes 12 seconds. That is, 300 sheets can be printed in one hour. One sheet can be recorded in 2.4 seconds at 5 KHz and in 1.2 seconds at 10 KHz.

In the present invention, an ink having a high concentration is used and by jetting out this ink at a driving frequency of 1 KHz or more, printing with excellent image quality can be attained in a high productivity.

The hitting frequency (ejection frequency) as a characteristic feature of the present invention can be controlled, in the case of a thermal ink jet system, by controlling the frequency of head-driving signals for heating the head.

In the case of a piezo system, the hitting frequency can be controlled by controlling the frequency of signals for driving the piezo.

The driving of the piezo head is described. As shown in FIG. 1, based on the signals of an image to be printed, the hitting size, hitting speed and hitting frequency are determined in the printer control section and the signals for driving a printer head are prepared. The driving signals are fed to the printer head. As shown in FIG. 2, the hitting size, hitting speed and hitting frequency are controlled by the signals for driving the piezo. The hitting size and hitting speed are determined by the shape and amplitude of the driving waveform, and the frequency is determined by the cycle period of signals.

When the hitting frequency is set to 10 KHz, the head is driven every 100 micro-seconds and one-line recording is completed in 400 micro-seconds. When the travelling speed of the recording paper is set such that the recording paper moves 1/600 inch, namely, about 42 micron per 400 micro-seconds, the printing can be attained at a speed of one sheet per 1.2 seconds.

For measuring the hitting speed, as shown in FIG. 3. a printer head is driven by the head-driving signals for hitting an ink. At the same time, a flying ink droplet is illuminated by a lamp for a short time through a circuit for generating a predetermined time lag and an enlarged photograph thereof is taken by a CCD camera at a predetermined magnification. On the photographed image, it can be determined where the ink droplet is present after a predetermined time since the printer head is driven by the driving signal. Based on this, the time from the driving of head until the ink droplet starts flying from the nozzle face and the time after driving of head until the ink droplet reaches the position corresponding to the distance between the head and the recording paper can be known and thus, the time after the ink droplet is jetted out from the head until it lands on the recording time is known, therefore, the speed can be determined.

Since the ink for use in the present invention is characterized by having a high concentration, a high-density image can be recorded with a small amount of ink and therefore, this is suitable for high-speed recording.

In performing the recording with a small amount of ink, the size of the ink droplet or the number of ink droplets may be reduced, however, when the number of ink droplets is reduced, the spatial frequency of the ink droplet landed on the recording paper becomes low and the fluctuation in the landing position may be disadvantageously viewed as unevenness or the image is increased in the roughness.

When the size of the ink droplet is reduced, a good image with small roughness can be obtained but if the ejection speed is low, the kinetic energy of the ink droplet becomes low and due to the effect of a disturbance factor, for example, when fluctuation of air or the like occurs during the time after ejection from the nozzle until landing on the recording paper, the speed or ejection direction changes and the landing position fluctuates.

Figure 5:
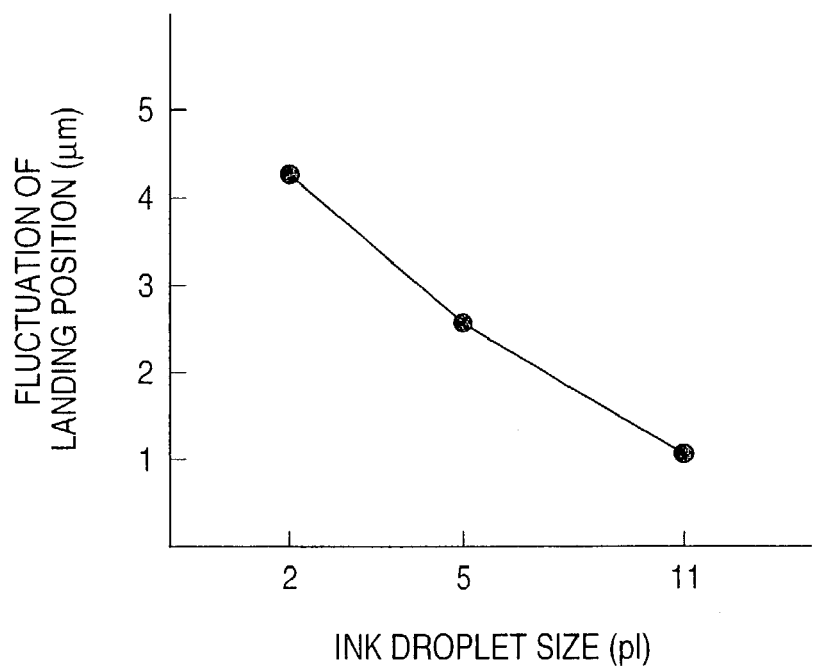
FIG. 5 is a view showing the relationship between the ink droplet size and the fluctuation in the landing position.
Figure 6:
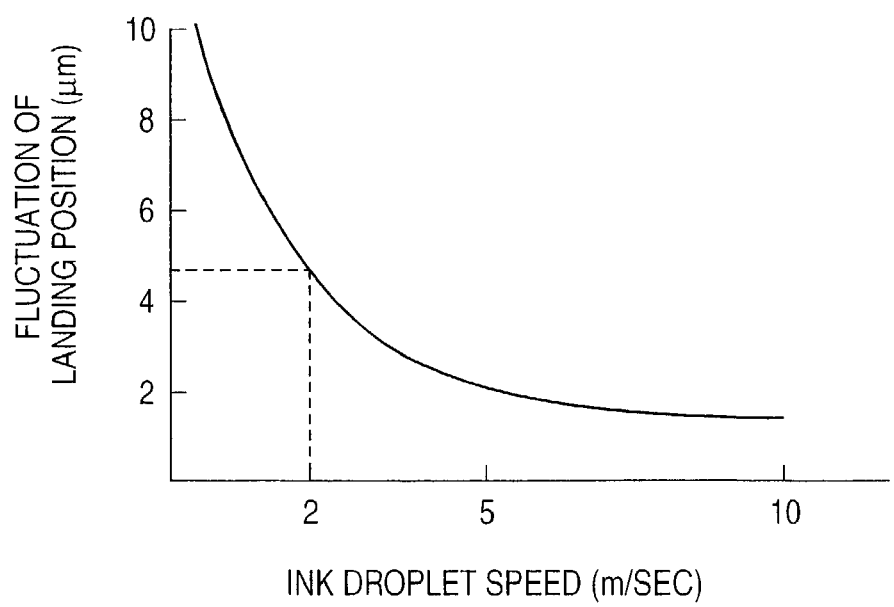
FIG. 6 is a view showing the relationship between the ink droplet hitting speed and the fluctuation in the landing position.

FIG. 5 shows the state where when an ink is hit at a speed of 2 m/sec, fluctuation in the landing position changes depending on the volume of the ink droplet. FIG. 6 shows the fluctuation in the landing position when an ink is hit in a volume of 2 pl and the speed is varied. It is seen that even when an ink in a high concentration is hit in a small droplet size, a good image can be recorded by hitting the ink at a high speed.

As such, by using a high-concentration ink and hitting it in a small ink droplet size at a high speed, a good image with scarcely perceivable unevenness can be recorded.

In order to finely express the gradation and attain high-density recording at a high speed, it is known effective to hit a mixture of ink droplets having a plurality of sizes.

With respect to the construction of printing apparatus and the construction of printer for use in the present invention, those disclosed, for example, in JP-A-11-170527 (the term "JP-A" as used herein means an "unexamined published Japanese patent application") are suitably used. With respect to the ink cartridge, those disclosed, for example, in JP-A-5-229133 are suitably used. With respect to the suction and the construction of cap or the like covering the printing head 28 at the suction, those disclosed, for example, in JP-A-7-276671 are suitably used. In the vicinity of head, a filter for eliminating bubbles, disclosed in JP-A-9-277552, is suitably provided.

Also, the surface of nozzle is suitably subjected to a water repellent treatment described in JP-A-2002-292878. The present invention may be used for a printer connected to a computer or for an apparatus specialized for the printing of a photograph.

The dye used in the ink for ink jet recording of the present invention is an azo dye having an aromatic nitrogen-containing 6-membered heterocyclic ring as the coupling component and is represented by formula (1). This dye is characterized in that the molecular absorption coefficient is high and a high density can be obtained with an equivalent amount.

In formula (1), A represents a 5-membered heterocyclic group.

$B^1$ and $B^2$ each represents $=CR^1-$ or $-CR^2=$ or either one of $B^1$ and $B^2$ represents a nitrogen atom and the other represents $=CR^1-$ or $-CR^2$. $R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

$R^1$ and $R^5$, or $R^5$ and $R^6$ may combine to form a 5- or 6-membered ring.

The dye of formula (1) is described in more detail.

In formula (1), A represents a 5-membered heterocyclic group. Examples of the heteroatom of the heterocyclic ring include N, O and S. A is preferably a nitrogen-containing 5-membered heterocyclic ring and the heterocyclic ring may be condensed with an aliphatic ring, an aromatic ring or another heterocyclic ring. Preferred examples of the heterocyclic ring include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among those, preferred are a pyrazole ring, an imidazole ring, an isothiazole ring, a thiadiazole ring and a benzothiazole ring represented by the following formulae (a) to (f):

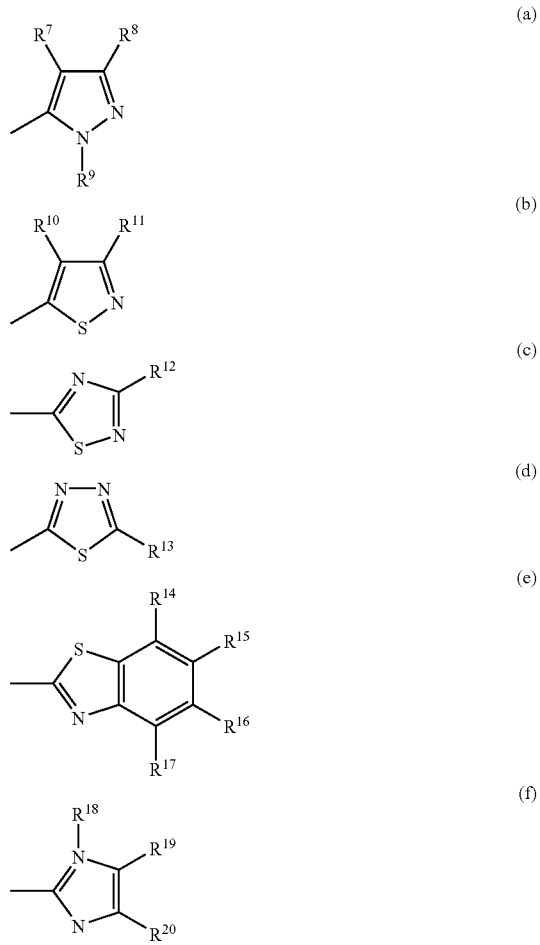

In formulae (a) to (f), $R^7$ to $R^{20}$ each represents the same substituent as G, $R^1$ and $R^2$ in formula (1).

Among formulae (a) to (f), preferred are a pyrazole ring and an isothiazole ring represented by formulae (a) and (b), and most preferred is a pyrazole ring represented by formula (a).

In formula (1), $B^1$ and $B^2$ each represents $=CR^1-$ or $-CR^2=$ or either one of $B^1$ and $B^2$ represents a nitrogen atom and the other represents $=CR^1-$ or $-CR^2$. $B^1$ and $B^2$ each preferably represents $=CR^1-$ or $-CR^2=$.

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

$R^5$ and $R^6$ each is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group. The hydrogen atom of each substituent may be substituted. However, $R^5$ and $R^6$ are not a hydrogen atom at the same time.

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

G is preferably a hydrogen atom, a halogen atom, an aliphatic group, an aromatic group, a hydroxy group, an alkoxy group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkyl thio group, an arylthio group or a heterocyclic thio group, more preferably a hydrogen atom, a halogen atom, an alkyl group, a hydroxy group, an alkoxy group, an aryloxy group, an acyloxy group, an amino group or an acylamino group, and most preferably a hydrogen atom, an amino group (preferably an anilino group) or an acylamino group. The hydrogen atom of each substituent may be substituted.

$R^1$ and $R^2$ each is preferably a hydrogen atom, an alkyl group, a halogen atom, an alkoxycarbonyl group, a carboxyl group, a carbamoyl group, a hydroxy group, an alkoxy group or a cyano group. The hydrogen atom of each substituent may be substituted.

$R^1$ and $R^5$, or $R^5$ and $R^6$ may combine to form a 5- or 6-membered ring.

When A has a substituent or when the substituent $R^1$, $R^2$, $R^5$, $R^6$ or G further has a substituent, examples of the substituent include the substituents set forth above for G, $R^1$ and $R^2$.

In the case where the dye for use in the present invention is a water-soluble dye, the dye preferably has further an ionic hydrophilic group as a substituent on any position of A, $R^1$, $R^2$, $R^5$, $R^6$ and G. Examples of the ionic hydrophilic group as the substituent include a sulfo group, a carboxyl group, a phosphono group and a quaternary ammonium group. Among these ionic hydrophilic group, preferred are a carboxyl group, a phosphono group and a sulfo group, more preferred are a carboxyl group and a sulfo group. The carboxyl group, the phosphono group and the sulfo group each may be in the salt state and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium).

The term (substituent) as used in the present invention is described. This term is common among different symbols in formula (1) and formula (1a) shown later.

The halogen atom includes a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. The "substituted" as used for a "substituted alkyl group" and the like in the present invention means that the hydrogen atom present in an "alkyl group" and the like is substituted by a substituent described above for G, $R^1$ and $R^2$.

The aliphatic group may be branched or may form a ring. The number of carbon atoms in the aliphatic group is preferably from 1 to 20, more preferably from 1 to 16. The aryl moiety in the aralkyl group and the substituted aralkyl group is preferably a phenyl group or a naphthyl group, more preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, more preferably a phenyl group. The number of carbon atoms in the aromatic group is preferably from 6 to 20, more preferably from 6 to 16.

Examples of the aromatic group include a phenyl group, a p-tolyl group, a p-methoxyphenyl group, an o-chlorophenyl group and an m-(3-sulfopropylamino)phenyl group.

The heterocyclic group includes a substituted heterocyclic group. In the heterocyclic group, the heterocyclic ring may be condensed with an aliphatic ring, an aromatic ring or another heterocyclic ring. The heterocyclic group is preferably a 5- or 6-membered heterocyclic group. Examples of the substituent in the substituted heterocyclic group include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent includes an alkyl group. Examples of the carbamoyl group include a methylcarbamoyl group and a dimethylcarbamoyl group.

The alkoxycarbonyl group include a substituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group. Examples of the heterocyclic ring include the heterocyclic rings described above for the heterocyclic group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes a substituted acyl group. The acyl group is preferably an acyl group having from 1 to 20 carbon atoms. Examples of the substituent include an ionic hydrophilic group. Examples of the acyl group include a benzoyl group.

The alkoxy group includes a substituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. Examples of the heterocyclic ring include the heterocyclic rings described above for the heterocyclic group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic group having from 1 to 20 carbon atoms or an aromatic group. Examples of the silyloxy group include trimethylsilyloxy and diphenylmethylsilyloxy.

The acyloxy group includes a substituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a substituted carbamoyloxy group. Examples of the substituent include an alkyl group. Examples of the carbamoyloxy group include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes a substituted amino group. Examples of the substituent include an alkyl group, an aryl group and a heterocyclic group and the alkyl group, the aryl group and the heterocyclic group each may further have a substituent. The alkylamino group includes a substituted alkylamino group. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes a substituted arylamino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings described above for the heterocyclic group. The heterocyclic amino group is preferably a heterocyclic amino group having from 2 to 20 carbon atoms. Examples of the substituent include an alkyl group, a halogen atom and an ionic hydrophilic group.

The acylamino group includes a substituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a substituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group and the arylsulfonylamino group include a substituted alkylsulfonylamino group and a substituted arylsulfonylamino group. The alkylsulfonylamino group and the arylsulfonylamino group are preferably an alkylsulfonylamino group having from 1 to 20 carbon atoms and an arylsulfonylamino group having from 1 to 20 carbon atoms. Examples of the substituent include an ionic hydrophilic group. Examples of the alkylsulfonylamino group and arylsulfonylamino group include a methylsufonylamino group, an N-phenyl-methylsulfonylamino group, a phenylsulfonylamino group and a 3-carboxyphenylsulfonylamino group.

The heterocyclic sulfonylamino group includes a substituted heterocyclic sulfonylamino group. Examples of the heterocyclic ring include the heterocyclic rings described above for the heterocyclic group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group. Examples of the heterocyclic ring include heterocyclic rings described above for the heterocyclic group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms. Examples of the substituent include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include a substituted alkylsulfonyl group and a substituted arylsulfonyl group. Examples of the alkylsulfonyl group and arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings described above for the heterocyclic group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thienylsulfonyl group and a 3-pyridylsulfonyl group.

The alkylsulfinyl group and the arylsulfinyl group includes a substituted alkylsulfinyl group and a substituted arylsulfinyl group. Examples of the alkylsulfinyl group and arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings described above for the heterocyclic group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridylsulfinyl group.

The sulfamoyl group includes a substituted sulfamoyl group. Examples of the substituent include an alkyl group. Examples of the sulfamoyl group include a dimethylsulfamoyl group and a di-(2-hydroxyethyl)sulfamoyl group.

In the present invention, the dye particularly preferably has a structure represented by the following formula (1a),

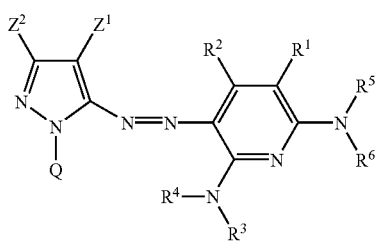

(1a)

In formula (1a), $R^1$, $R^2$, $R^5$ and $R^6$ have the same meanings as in formula (1).

$R^3$ and $R^4$ each independently represents a hydrogen atom or a substituent, and the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each is preferably a hydrogen atom, an aromatic group, a heterocyclic group, an acyl group, an alkylsulfonyl group or an arylsulfonyl group, more preferably a hydrogen atom, an aromatic group or a heterocyclic group.

$Z^1$ represents an electron withdrawing group having a Hammett's substituent constant σp value of 0.20 or more. $Z^1$ is preferably an electron withdrawing group having a σp value of 0.30 or more, more preferably 0.45 or more, still more preferably 0.60 or more, but the σp value preferably does not exceed 1.0. Specific preferred examples of this substituent include electron withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$Z^2$ represents a hydrogen atom or a substituent and the substituent is an aliphatic group, an aromatic group or a heterocyclic group. $Z^2$ is preferably an aliphatic group, more preferably an alkyl group having from 1 to 6 carbon atoms.

Q represents a hydrogen atom or a substituent and the substituent is an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The hydrogen atom of each substituent described in regard to formula (1a) may be substituted. Examples of the substituent include the substituents described in regard to formula (1), the groups described as examples for G, $R^1$ and $R^2$, and ionic hydrophilic groups.

Here, the Hammett's substituent constant σp value as used in the present invention is described. The Hammett's rule is a rule of thumb advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler) *Lange's Handbook of Chemistry*, 12th ed., McGraw-Hell (1979), and *Kagakuno Ryoiki (Chemistry Region)*, special number, No. 122, pp. 96–103, Nankodo (1979). In the present invention, each substituent is limited or described using the Hammett's substituent constant σp value but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1a) of the present invention includes those which are not a benzene derivative, the σp value is used as a measure for showing the electron effect of the substituent irrespective of the substitution site. In the present invention, the σp value is used in this meaning.

Examples of the electron withdrawing group having a Hammett's substituent constant σp value of 0.60 or more include a cyano group, a nitro group, an alkylsulfonyl group (e.g., methylsulfonyl) and an arylsulfonyl group (e.g., phenylsulfonyl).

Examples of the electron withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., triphloromethyl).

Examples of the electron withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., triphloromethyloxy), a halogenated aryloxy group (e.g., pentaphlorophenyloxy), a sulfonyloxy group (e.g., methylsulfonyloxy), a halogenated alkylthio group (e.g., diphloromethylthio), an aryl group substituted by two or more electron withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron withdrawing group having a σp value of 0.20 or more include, in addition to those described above, a halogen atom.

In the azo dye represented by formula (1), the preferred combination of substituents is described below. $R^5$ and $R^6$ each is preferably a hydrogen atom, an alkyl group, an aryl group, a heterocyclic group, a sulfonyl group or an acyl group, more preferably a hydrogen tom, an aryl group, a heterocyclic group or a sulfonyl group, and most preferably a hydrogen atom, an aryl group or a heterocyclic group. However, $R^5$ and $R^6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each is $=CR^1-$ or $-CR^2=$, and $R^1$ and $R^2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are set forth below, however, the azo dye for use in the present invention is not limited to those set forth below.

TABLE 1

| Dye | $R_1$ | $R_2$ | $R_3$ |
|---|---|---|---|
| a-1 | 2-benzothiazolyl | —C₆H₄—C₈H₁₇ | —C₆H₄—C₈H₁₇ |
| a-2 | 5-chloro-2-benzothiazolyl | —C₆H₄—C₈H₁₇ | 2,4,6-trimethylphenyl |

TABLE 1-continued

| Dye | R₁ | R₂ | R₃ |
|---|---|---|---|
| a-3 | 2-methyl-6-chlorobenzothiazol-yl | 2,4,5-trimethylphenyl | 4-C₈H₁₇-phenyl |
| a-4 | 2-methylbenzothiazol-yl | 2-methyl-6-OC₈H₁₇-phenyl | 4-C₈H₁₇-phenyl |
| a-5 | 2-methyl-5-nitrobenzothiazol-yl | 2,4-dimethyl-6-CH₃-phenyl | 2,4-dimethylphenyl |

TABLE 2

| Dye | R₁ | R₂ | R₃ |
|---|---|---|---|
| a-6 | 2-methylbenzothiazol-6-yl-SO₂NH−(CH₂)₃−O− | 2-tert-pentyl-4-[1-methyl-1-(4-methylphenyl)ethyl]phenyl | 4-methylphenyl |
| a-7 | 2-methylbenzothiazol-6-yl-SO₂NH−(CH₂)₃−OCH₂CH(C₈H₁₇)(C₆H₁₃) | 2-methyl-5-chlorobenzothiazol-yl | 4-methylphenyl |

TABLE 2-continued

| Dye | R₁ | R₂ | R₃ |
|---|---|---|---|
| a-8 | 2-methylbenzothiazol-6-yl | -NHCOCH(Et)-O-(2,4-di-tert-amylphenyl) | 4-C₈H₁₇-phenyl, 4-C₈H₁₇-phenyl |
| a-9 | 2-methylbenzothiazol-6-yl | -NHSO₂-(2-(n)C₈H₁₇O-5-C₈H₁₇(t)-phenyl) | 2,4,6-trimethylphenyl, 4-C₈H₁₇(t)-phenyl |
| a-10 | 5-chloro-2-methylbenzothiazol-6-yl | 2-OC₁₂H₂₅-phenyl | 2-OC₁₂H₂₅-phenyl |

TABLE 3

| Dye | R₁ | R₂ | R₃ | R₄ |
|---|---|---|---|---|
| a-11 | tert-butyl | 2-methyl-6-SO₂Na-benzothiazol-yl | 4-methylphenyl | 4-SO₃Na-phenyl |
| a-12 | phenyl | 2-phenyl-6-COOH-benzothiazol-yl | 4-SO₃K-phenyl | 3-COOH-phenyl |

TABLE 3-continued

Structure: pyrazole-azo-pyridine dye with R1 at pyrazole 3-position, CN at pyrazole 4-position, R2 on pyrazole N1; pyridine ring bears CH3, CN, NHR4, and NHR3 substituents.

| Dye | R1 | R2 | R3 | R4 |
|---|---|---|---|---|
| a-13 | 2-chloro-5-methylphenyl (Cl, CH3 on phenyl) | 2-(benzothiazolyl)-SO3K (4,5-mix) | 4-methylphenyl-SO3K | 3-methyl-4-COOH-phenyl |
| a-14 | tert-butyl | 2-methylbenzothiazol-6-yl-SO3Na | 2,3,5-trimethyl-4-SO3Na-phenyl (with CH3 groups) | 2,3,5-trimethyl-4-SO3Na-phenyl |
| a-15 | tert-butyl | 2-methylbenzothiazol-6-yl-SO3K | 2,3,5-trimethyl-4-SO3K-phenyl | 2,3,5-trimethyl-4-SO3K-phenyl |
| a-16 | tert-butyl | 2-methyl-6-chlorobenzothiazolyl | 3,5-dimethyl-4-methyl-phenyl-CH2-N(CH2CO2H)2 | 3,5-dimethyl-4-methyl-phenyl-CH2-N(CH2CO2H)2 |
| a-17 | tert-butyl | 2-methylbenzothiazol-6-yl-SO3Na | 3,5-dimethylphenyl-SO3Na | 3,5-dimethylphenyl-SO3Na |

TABLE 4
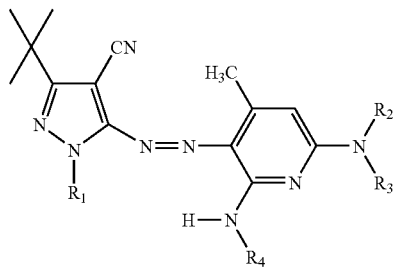
| Dye | R₁ | R₂ | R₃ | R₄ |
|---|---|---|---|---|
| a-18 | 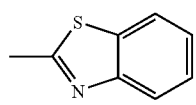 | 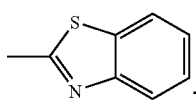 | 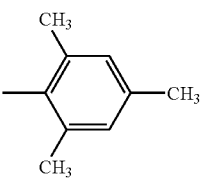 | 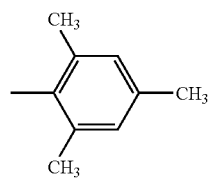 |
| a-19 | 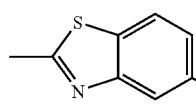 | —SO₂CH₃ | 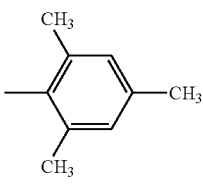 | 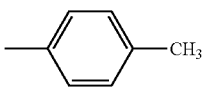 |
| a-20 | 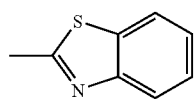 | —COCH₃ | $C_8H_{17(t)}$ | $C_8H_{17(t)}$ |
| a-21 | 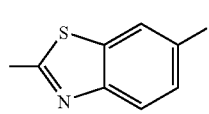 | —SO₂CH₃ | 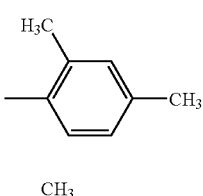 | $C_8H_{17}(t)$ |
| a-22 |  | H | 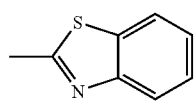 | 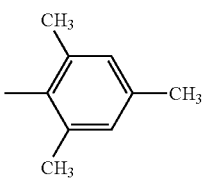 |
| a-23 | 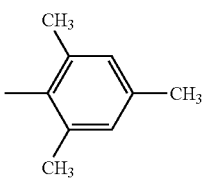 | H | 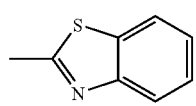 | 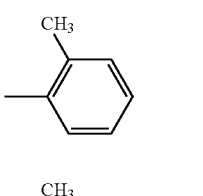 |
| a-24 | 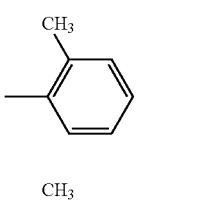 | H | 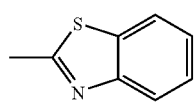 | 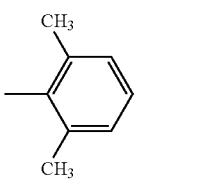 |

TABLE 4-continued

[Structure: pyrazole with t-butyl and CN groups, azo-linked to pyridine bearing H₃C, NR₂R₃, and NHR₄ substituents; pyrazole N-R₁]

| Dye | R₁ | R₂ | R₃ | R₄ |
|---|---|---|---|---|
| a-25 | 2-benzoxazolyl | 2-benzoxazolyl | 2,3,5-trimethylphenyl (mesityl-type, CH₃ groups) | 2,3,5-trimethylphenyl (mesityl-type, CH₃ groups) |

TABLE 5

[Structure: same pyrazole-azo-pyridine core as above]

| Dye | R₁ | R₂ |
|---|---|---|
| a-26 | 2-benzothiazolyl | 2-methylbenzothiazol-6-yl-SO₂NH—(CH₂)₃—O—(2,4-di-tert-pentylphenyl) |
| a-27 | 2-methylbenzothiazol-6-yl-SO₂NH—(CH₂)₃—O—(2,4-di-tert-pentylphenyl) | 2-methylbenzothiazol-6-yl-SO₂NH—(CH₂)₃—O—(2,4-di-tert-butylphenyl) |
| a-28 | 5-chloro-2-methylbenzothiazolyl | 2-methylbenzothiazol-6-yl-NHC(=O)CH(Et)—O—(2,4-di-tert-butylphenyl) |
| a-29 | 2-methylbenzothiazolyl | 2-methylbenzothiazolyl |

TABLE 5-continued
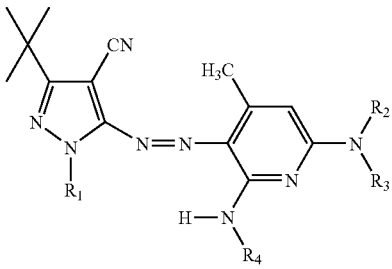
| | | Dye | R₃ | R₄ |
|---|---|---|---|---|
| a-30 | 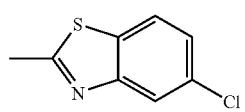 | | 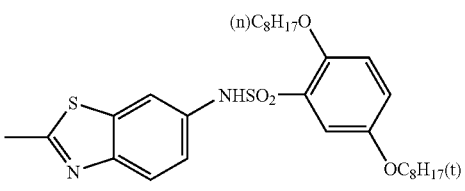 | |
| a-31 | 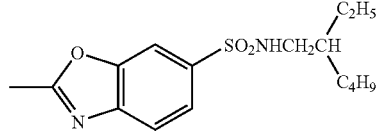 | | 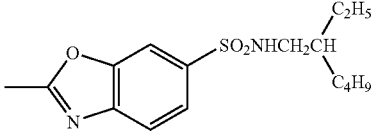 | |
| | | a-26 | 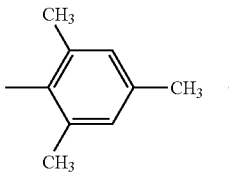 | 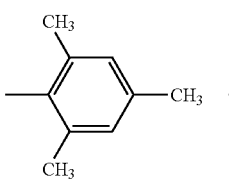 |
| | | a-27 | 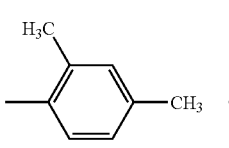 | 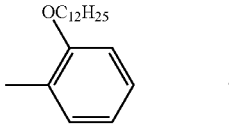 |
| | | a-28 | 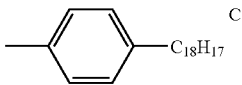 | 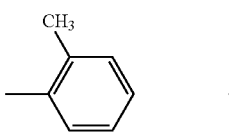 |
| | | a-29 | OC₁₂H₂₅ phenyl | OC₁₂H₂₅ phenyl |
| | | a-30 | -C₆H₄-C₁₈H₁₇ | C₈H₁₇(t) |
| | | a-31 | o-CH₃-C₆H₄- | o-CH₃-C₆H₄- |

TABLE 6
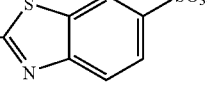
| Dye | R₁ | R₂ |
|---|---|---|
| a-32 | 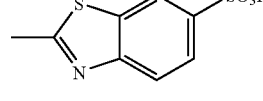 | 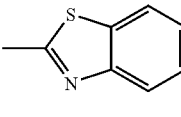 |
| a-33 | 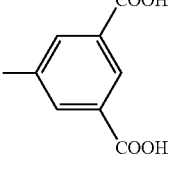 | 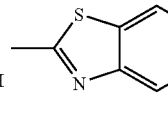 |
| a-34 | 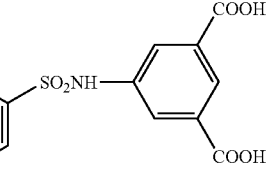 (5,6-mix) | 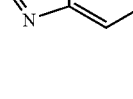 (5,6-mix) |
| a-35 |  (5,6-mix) | 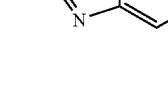 (5,6-mix) |
| Dye | R₃ | R₄ |
|---|---|---|
| a-32 | 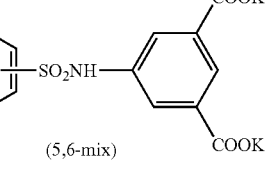 | 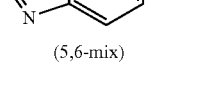 |
| a-33 | 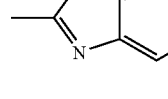 | 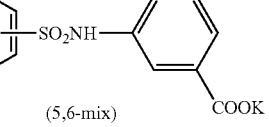 |
| a-34 | 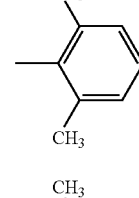 | 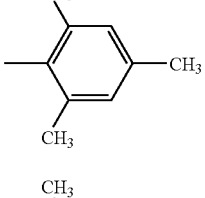 |

TABLE 6-continued
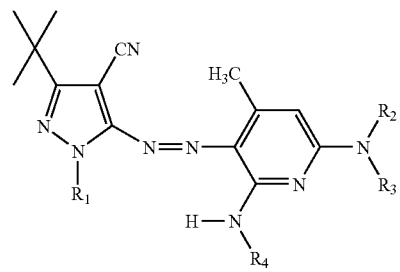
| | a-35 | 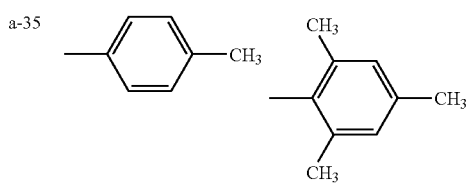 |
TABLE 7
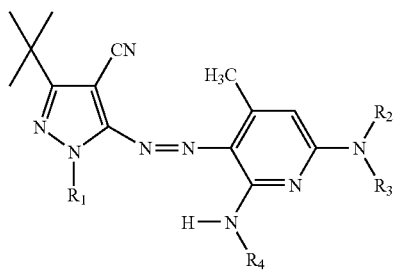
| Dye | R₁ | R₂ |
|---|---|---|
| a-36 | 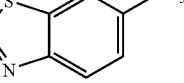 (2-benzothiazolyl-6-SO₃Na) | 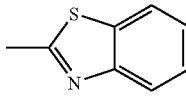 (2-benzothiazolyl-6-SO₃Na) |
| a-37 | 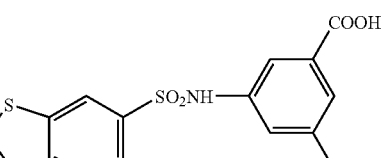 (2-benzothiazolyl-6-SO₂NH-phenyl-3,5-(COOH)₂) | 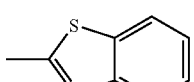 (2-benzothiazolyl) |
| a-38 | 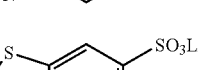 (2-benzothiazolyl-6-SO₃Li) | 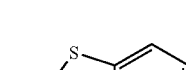 (2-benzothiazolyl-6-SO₃Li) |
| a-39 | 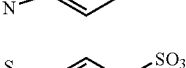 (2-benzothiazolyl-6-SO₃Na) | 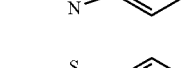 (2-benzothiazolyl-6-SO₃Na) |
| a-40 | 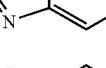 (2-benzothiazolyl) | 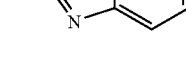 (2-benzothiazolyl-6-SO₃K) |

TABLE 7-continued
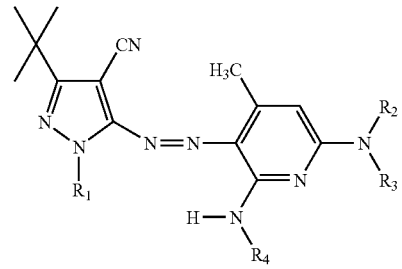
| Dye | R₃ | R₄ |
|---|---|---|
| a-36 | 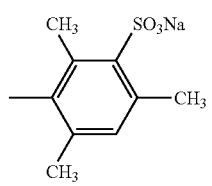 | 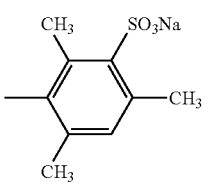 |
| a-37 | 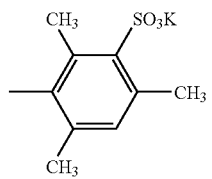 | 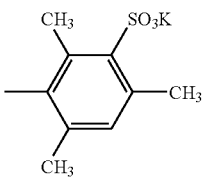 |
| a-38 | 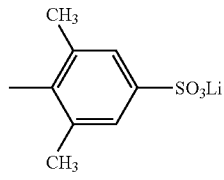 | 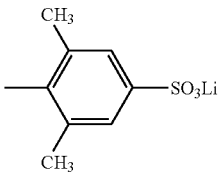 |
| a-39 | 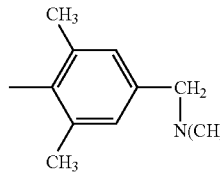 | 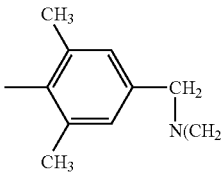 |
| a-40 | 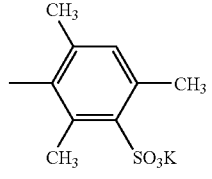 | 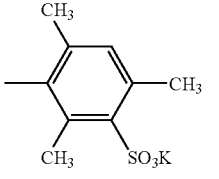 |

TABEL 8

[Structure: pyrazole-azo-pyridine with substituents R1, R2 on pyrazole, R3 on pyrazole N, R4, R5 on pyridine, NR6R7 and NHR8 amino groups]

| Dye | $R_1$ | $R_2$ | $R_3$ | $R_4$ | $R_5$ | $R_6$ |
|---|---|---|---|---|---|---|
| a-41 | CH$_3$ (2-methylphenyl) | CN | 2-pyridyl | H | CONH$_2$ | SO$_2$CH$_3$ |
| a-42 | C(CH$_3$)$_3$ | Br | 2-pyrimidyl | COOEt | H | 2-benzothiazolyl |
| a-43 | 2-pyridyl | SO$_2$CH$_3$ | 4,6-bis(NHCH$_3$)-1,3,5-triazin-2-yl | NHCH$_3$ | CONH$_2$ | 6-chloro-2-benzothiazolyl |
| a-44 | C(CH$_3$)$_3$ | CN | 2,4,5-tricyanophenyl | H | H | 5-chloro-2-benzothiazolyl |
| a-45 | C(CH$_3$)$_3$ | Br | 2,6-dichloro-4-nitrophenyl | H | CONH$_2$ | COCH$_3$ |
| a-46 | C(CH$_3$)$_3$ | CN | 2-benzothiazolyl | CH$_3$ | H | 2-benzothiazolyl |

| Dye | $R_7$ | $R_8$ |
|---|---|---|
| a-41 | 2-(OC$_8$H$_{17}$)phenyl | 2-methylphenyl |
| a-42 | C$_8$H$_{17}$(t) | COCH$_3$ |
| a-43 | 4-(CH$_3$)phenyl-CH$_2$-CO-C(CH$_3$)$_3$ | |

TABEL 8-continued
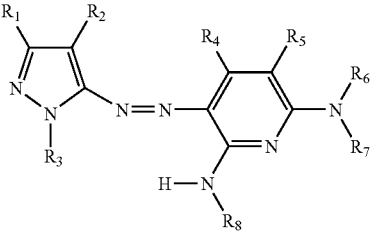
| | R₁ | R₂ | | | |
|---|---|---|---|---|---|
| a-44 | | CH₃ | | | SO₂CH₃ |
| | 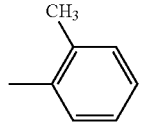 | | | | |
| a-45 | | CH₃ | | | |
| |  | | | | 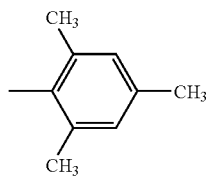 |
| a-46 | | C₂H₅ | | | C₂H₅ |
| | 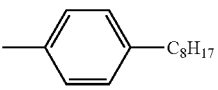 | | | | 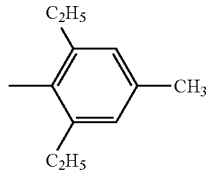 |
TABLE 9
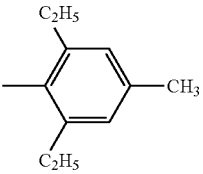
| Dye | R₁ | R₂ | R₃ | R₄ | R₅ | R₆ | |
|---|---|---|---|---|---|---|---|
| b-1 | CH₃ | CH₃ | CN | H | | 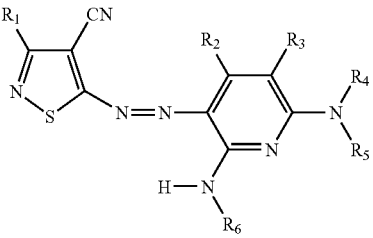 | |
| b-2 | CH₃ | CH₃ | CN | H | | 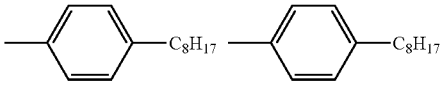 | |
| b-3 | CH₃ | CH₃ | CONH₂ | H | | 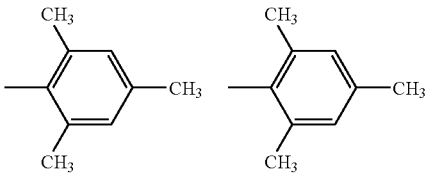 | 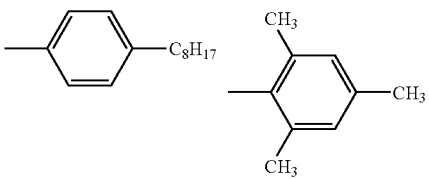 |

TABLE 9-continued

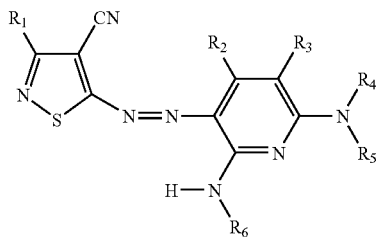

| Dye | R₁ | R₂ | R₃ | R₄ | R₅ | R₆ |
|-----|-----|-----|-----|-----|-----|-----|
| b-4 | CH₃ | CH₃ | H | H | 2,3,4,6-tetramethyl-5-SO₃Li phenyl | 2,3,4,6-tetramethyl-5-SO₃Li phenyl |
| b-5 | CH₃ | H | CN | H | 4-SO₃Na phenyl | 4-SO₃Na phenyl |

TABLE 10

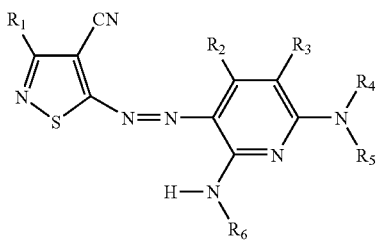

| Dye | R₁ | R₂ | R₃ | R₄ | R₅ | R₆ |
|-----|-----|-----|-----|-----|-----|-----|
| b-6 | CH₃ | CH₃ | H | 2-benzothiazolyl | 2,3,4,6-tetramethyl-5-CH₂N(CH₂CO₂K)₂ phenyl | 2,3,4,6-tetramethyl-5-CH₂N(CH₂CO₂K)₂ phenyl |
| b-7 | CH₃ | CH₃ | H | 2-benzothiazolyl | 2,4,6-trimethylphenyl | 4-C₈H₁₇ phenyl |
| b-8 | CH₃ | H | H | SO₂CH₃ | 3,4-dimethyl-SO₃Na phenyl | 3,4-dimethyl-SO₃Na phenyl |

TABLE 11

[Structure: pyridine ring with R2, R3 substituents, NHR6, NR4R5 groups, connected via N=N azo linkage to a 1,2,4-thiadiazole bearing R1]

| Dye | R₁ | R₂ | R₃ | R₄ |
|-----|-----|-----|-----|-----|
| c-1 | —SCH₃ | CH₃ | CN | H |
| c-2 | —C₆H₅ (phenyl) | H | CONH₂ | H |
| c-3 | —S—CH₂CH₂—SO₃K (via S) | CH₃ | H | 2-methylbenzothiazol-6-yl-SO₃K |
| c-4 | —CH₃ | CH₃ | H | 2-methylbenzothiazol-6-yl-SO₂NH-(CH₂)₃-O-(2,4-di-tert-amylphenyl) |
| c-5 | —C₆H₅ (phenyl) | H | H | 2-methylbenzothiazol-6-yl-NHSO₂-(2-OC₈H₁₇(n), 5-C₈H₁₇(t))phenyl |

| Dye | R₅ | R₆ |
|-----|-----|-----|
| c-1 | C₈H₁₇(t) | 4-C₈H₁₇-phenyl |
| c-2 | 4-SO₃K-phenyl | 4-SO₃K-phenyl |
| c-3 | 4-SO₃K-phenyl | 4-SO₃K-phenyl |
| c-4 | 2,4,6-trimethylphenyl (mesityl) | 4-C₈H₁₇-phenyl |

TABLE 11-continued

[Structure: 1,2,4-thiadiazole-azo-pyridine dye with substituents R1, R2, R3, R4, R5, R6]

| | | |
|---|---|---|
| c-5 | 2,4,6-trimethylphenyl (mesityl) | C₈H₁₇(t) |

TABLE 12

[Structure: 1,3,4-thiadiazole-azo-benzene dye with substituents R¹, R², R³, R⁴, R⁵, R⁶]

| Dye | R₁ | R₂ | R₃ | R₄ | R₅ | R₆ |
|---|---|---|---|---|---|---|
| d-1 | Me | CH₃ | CN | H | 4-(SO₃K)phenyl | 4-(SO₃K)phenyl |
| d-2 | Me | CH₃ | CN | H | 3,5-diethyl-4-methylphenyl | 3,5-diethyl-4-methylphenyl |
| d-3 | Me | H | H | 2-benzothiazolyl | 2,4,6-trimethyl-3-(SO₃K)phenyl | 2,4,6-trimethyl-3-(SO₃K)phenyl |
| d-4 | Ph | CH₃ | CONH₂ | H | 4-C₈H₁₇-phenyl | 4-C₈H₁₇-phenyl |

TABLE 12-continued

[Structure: 1,3,4-thiadiazole connected via N=N to a benzene ring with substituents R², R³, NR⁴R⁵, and NHR⁶; R¹ on thiadiazole]

| Dye | R₁ | R₂ | R₃ | R₄ | R₅ | R₆ |
|---|---|---|---|---|---|---|
| d-5 | Ph | CH₃ | H | 2-methylbenzothiazol-6-yl-SO₂NH(CH₂)₃O-(2,4-di-tert-pentylphenyl) | 4-(n-OC₄H₉)-phenyl | 2,4,6-triethyl-3,5-dimethylphenyl (2,4-di-C₂H₅-3,5-di-CH₃-phenyl with CH₃) |

TABLE 13

[Structure: benzothiazole connected via N=N to a pyridine ring with R², R³, NR⁴R⁵, NHR⁶ substituents; R₁ on benzothiazole]

| Dye | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-methylbenzothiazol-2-yl | 4-C₈H₁₇-phenyl | 4-C₈H₁₇-phenyl |
| e-3 | 5,6-diCl | CH₃ | H | 2-methylbenzothiazol-2-yl | 2,4,6-trimethylphenyl | COCH₃ |
| e-4 | 5-CH₃ | H | CN | H | 4-SO₃K-phenyl | 4-SO₃K-phenyl |
| e-5 | 5-NO₂ | CH₃ | H | SO₂CH₃ | 2,3-dimethylphenyl | 2,4,6-trimethylphenyl |

TABLE 13-continued

[Structure diagram with substituents R¹-R⁸ on benzothiazole-azo-pyridine dye]

| Dye | R₁ | R₂ | R₃ | R₄ | R₅ | R₆ |
|-----|----|----|----|----|----|----| f-1 [structure shown]

f-2 [structure shown]

The ink composition (in the present invention, sometimes simply referred to as "ink") for ink jet recording of the present invention is obtained by dissolving and/or dispersing at least one azo dye described above in an aqueous medium and the azo dye is preferably contained in an amount of 0.2 to 20 mass %, more preferably from 0.5 to 15 mass %.

The second embodiment of the ink jet (image) recording method of the present invention is described below.

The ink jet image recording method of the present invention is characterized in that an ink containing a dye represented by formula (I) is hit on a recording material at a hitting frequency of 1 kHz or more. The hitting frequency is preferably 5 kHz or more, more preferably 10 kHz or more.

In order to record a high-quality image like a photograph, the hitting density must be generally 600 dpi or more so that an image having high sharpness can be reproduced by small ink droplets. In the case of recording an image using an ink having a low concentration, a high-density image must be obtained by repeatedly hitting the ink at a high density, as a result, the recording time is prolonged and the productivity decreases.

The ink for use in the present invention is characterized by having a high concentration and therefore, a high-density recording can be attained even with small ink droplets. Furthermore, by hitting the ink at a hitting frequency within the above-described range, a high-quality image can be recorded in a short time with good productivity even if a large number of head nozzles are not provided.

The present invention is not limited on the ink jet recording system and is used for a known system, for example, an electric charge controlling system of jetting out the ink by using the electrostatic induction force, a drop-on-demand system (pressure pulse system) of using an oscillation pressure of a piezo element, an acoustic ink jet system of converting electric signals into acoustic beams, irradiating the beams on the ink and jetting out the ink using the radiation pressure, and a thermal ink jet (bubble jet) system of heating the ink to form bubbles and utilizing the generated pressure.

The ink jet recording system includes a system of ejecting a large number of small-volume ink droplets of so-called photo ink having a low concentration, a system of improving the image quality by using a plurality of inks substantially the same in the color but different in the concentration, and a system using a colorless transparent ink.

FIG. 1 is a block diagram of a general ink jet printer. When signals of an image to be printed are input in a printer control section, the hitting size, hitting speed and hitting frequency are determined in the printer control section and signals for operating the hitting size, hitting speed and hitting frequency are prepared in respective control sections, thereby preparing signals for driving a printer head. The driving signals are fed from the printer head-driving section and according to the driving signals, the printer head hits ink to print an image. The driving system of the printer head according to the driving signals varies depending on the recording system of the printer, however, the hitting frequency of ink, which is a characteristic feature of the present invention, is controlled mainly by controlling the driving signals of the printer head.

For example, in the case of a thermal ink jet system, the hitting frequency can be controlled by controlling the frequency of the head-driving signals for heating the printer head. In the case of a drop-on-demand system using a piezo element, the hitting frequency can be controlled by controlling the frequency of signals for driving the piezo element.

The driving of a printer head by a drop-on-demand system using a piezo element is described in more detail.

As shown in FIG. 2(a), a piezo element is disposed in the position contacting with the ink path for guiding an ink to the nozzle plate. The piezo element is, as well known, an element using a phenomenon that the crystal structure is distorted upon application of a voltage. This element has a very rapid response property. As shown in FIG. 2(b), when a voltage (driving signal) is applied, the piezo element is elongated during the time of application and deforms the side wall of the ink path. As a result thereof, the volume of the ink path is shrunk according to the elongation of the piezo element and the ink corresponding to this shrunk portion is ejected as an ink droplet from the nozzle (FIG. 2(c)). The elongation and shrinkage of the piezo element occur according to the application of driving signals and therefore, the hitting frequency of ink can be determined by the cycle period of driving signal.

Since the ink for use in the present invention is characterized by having a high concentration as described later, a high-density image can be recorded with a small amount of ink and therefore, this is suitable for high-speed recording.

In performing the recording with a small amount of ink, the size of the ink droplet or the number of ink droplets may be reduced, however, when the number of ink droplets is reduced, the distance between ink droplets landed on the recording material becomes large, as a result, fluctuation in the landing position increases and this is readily viewed as unevenness or the image is increased in the roughness.

When the size of the ink droplet is reduced, a good image with small roughness can be obtained but if the hitting speed is low, the kinetic energy of the ink droplet becomes low and due to the effect of a disturbance factor, for example, when fluctuation of air or the like occurs during the time after ejection from the nozzle until landing on the recording material, the speed or ejection direction changes and the landing position greatly fluctuates to cause unevenness in the image. FIG. 5 shows the relationship between the size (hitting volume) of an ink droplet and the fluctuation of landing position when the average hitting speed is constant (2 m/sec). As seen in FIG. 5, the fluctuation is larger as the ink droplet size is smaller.

However, as seen from FIG. 6 showing the relationship between the average hitting speed and the fluctuation in the landing position when the hitting volume is constant (2 pl), the fluctuation in the landing position is smaller as the average hitting speed is higher. Therefore, when an ink in a high concentration is hit at an average hitting speed of 2 m/sec or more as in the present invention, a good image with scarcely perceivable unevenness can be recorded at a high speed.

In order to record an image in a high density at a high speed while finely expressing the gradation, it is known effective to hit a mixture of ink droplets differing in the size (hitting volume) (see, *Ink Jet Kirokuno Kogashitsu, Kosokuka Gijutsu to Kanren Zairyo no Kaihatsu* (*Technology for High Quality and High Speed Ink Jet Recording and Development of Related Materials*), Gijutsu Joho Kyokai, page 52).

As described above, the fluctuation in the landing position becomes larger as the hitting volume of an ink droplet is smaller and the average hitting speed must be increased. Therefore, when the average hitting speed of ink droplets in a small hitting volume is set higher than the average hitting speed of ink droplets in a large hitting volume, a good image with fine gradation and less unevenness can be recorded at a high speed.

The present invention is not limited on the ink jet recording system and is used for a known system, for example, an electric charge controlling system of jetting out the ink by using the electrostatic induction force, a drop-on-demand system (pressure pulse system) of using an oscillation pressure of a piezo element, an acoustic ink jet system of converting electric signals into acoustic beams, irradiating the beams on the ink and jetting out the ink using the radiation pressure, and a thermal ink jet (bubble jet) system of heating the ink to form bubbles and utilizing the generated pressure.

The ink jet recording system includes a system of ejecting a large number of small-volume ink droplets of so-called photo ink having a low concentration, a system of improving the image quality by using a plurality of inks substantially the same in the color but different in the concentration, and a system using a colorless transparent ink.

FIG. 1 is a block diagram of a general ink jet printer. When signals of an image to be printed are input in a printer control section, the hitting size, hitting speed and hitting frequency are determined in the printer control section and signals for operating the hitting size, hitting speed and hitting frequency are prepared in respective control sections, thereby preparing signals for driving a printer head. The driving signals are fed from the printer head-driving section and according to the driving signals, the printer head hits ink to print an image.

The driving system of the printer head according to the driving signals varies depending on the recording system of the printer, however, the average hitting speed of ink, which is a characteristic feature of the present invention, can be controlled by controlling the shape and amplitude of waveforms for driving the printer head.

The driving of a printer head by a drop-on-demand system using a piezo element is described in more detail.

As shown in FIG. 2(a), a piezo element is disposed in the position contacting with the ink path for guiding an ink to the nozzle plate. The piezo element is, as well known, an element using a phenomenon that the crystal structure is distorted upon application of a voltage. This element has a very rapid response property. As shown in FIG. 2(b), when a voltage (driving signal) is applied, the piezo element is elongated during the time of application and deforms the side wall of the ink path. As a result thereof, the volume of the ink path is shrunk according to the elongation of the piezo element and the ink corresponding to this shrunk portion is ejected as an ink droplet from the nozzle (FIG. 2(c)).

The hitting speed of an ink droplet varies according to the speed or size of elongation of the piezo element and therefore, the average hitting speed of ink can be determined by the waveform of driving signal. Similarly, the hitting volume of ink can also be determined by the amplitude of driving signal waveform.

Furthermore, by using a plurality of driving waveforms and selecting an appropriate waveform, a plurality of ink droplets differing in the hitting volume and average hitting speed can be hit with the same printer head.

The ink droplet size (hitting volume) can be measured, for example, by the system shown in FIG. 3. A printer head is driven by the head-driving signals for hitting the ink. At the same time, a circuit for generating a predetermined time lag is adjusted, a flying ink droplet is illuminated by a lamp for a short time, and an enlarged photograph thereof is taken by a CCD camera at a predetermined magnification. FIG. 4 shows an image photographed and on this photographed image, the diameter R of the ink droplet can be determined. From the value obtained, the volume V can be determined according to the following formula:

$$V = \frac{4}{3}\pi\left(\frac{R}{2}\right)^3 \div 1000$$

Furthermore, by determining using the above-described CCD camera where the ink droplet is present after a predetermined time since the printer head is driven by the driving signal, the time after the printer head is driven and the ink droplet starts flying from the nozzle face until the ink droplet reaches the position corresponding to the distance between the printer head and the recording material can be known and therefrom, the average hitting speed can be determined.

The ink jet image recording method of the present invention is characterized in that an ink containing a dye represented by formula (I) is hit on a recording material at an average hitting speed of 2 m/sec or more. The average hitting speed is preferably 5 m/sec or more.

The average hitting speed as used herein means a speed obtained by dividing a distance from the nozzle face of a printer head to a recording material by the time after the leading end of an ink droplet starts jetting out from the nozzle face until it lands on the recording material.

With respect to the construction of printing apparatus and the construction of printer for use in the present invention, those disclosed, for example, in JP-A-11-170527 are suitably used. With respect to the ink cartridge, those disclosed, for example, in JP-A-5-229133 are suitably used. With respect to the suction and the construction of cap or the like covering the printing head at the suction, those disclosed, for example, in JP-A-7-276671 are suitably used. In the vicinity of head, a filter for eliminating bubbles, disclosed in JP-A-9-277552, is suitably provided. Also, the surface of nozzle is suitably subjected to a water repellent treatment described in Japanese Patent Application No. 2001-16738. The present invention may be used for a printer connected to a computer or for an apparatus specialized for the printing of a photograph.

The ink for ink jet recording, which is used in the present invention, is described below.

The ink for ink jet recording, which is used in the present invention, contains at least one phthalocyanine dye represented by formula (I).

The phthalocyanine dye is a dye having fastness but is known to exhibit poor fastness to ozone gas when used as a dye for ink jet recording.

In the present invention, an electron withdrawing group is preferably introduced into the phthalocyanine skeleton to have an oxidation potential nobler than 1.0 V (vs SCE) and thereby reduce the reactivity with ozone which is an electrophilic agent. A nobler oxidation potential is more preferred and the oxidation potential is more preferably nobler than 1.1 V (vs SCE) and most preferably nobler than 1.2 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Method*), Gihodo Shuppan Sha (1984).

More specifically, a test sample is dissolved to a concentration of $1 \times 10^{-4}$ to $1 \times 10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) using a cyclic voltammetry or a direct current polarography. This value sometimes deviates on the order of tens of millivolt due to the effect of liquid junction potential, liquid resistance of the sample solution, or the like, however, the reproducibility of potential can be guaranteed by adding a standard sample (for example, hydroquinone).

In order to univocally specify the potential, in the present invention, the value (vs SCE) measured by a direct current polarography in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox (oxidation potential) value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler by introducing an electron withdrawing group and becomes baser by introducing an electron donating group. In the present invention, the oxidation potential is preferably rendered nobler by introducing an electron withdrawing group into the phthalocyanine skeleton so as to reduce the reactivity with ozone which is an electrophilic agent. Accordingly, when the Hammett's substituent constant σp value as a measure for the electron withdrawing property or electron donating property of substituent is used, the oxidation potential can be rendered nobler by introducing a substituent having a large σp value, such as sulfinyl group, sulfonyl group and sulfamoyl group.

As such, also from the standpoint of controlling the potential, the phthalocyanine dye represented by formula (I) is preferred.

In formula (I), $X_1$, $X_2$, $X_3$ and $X_4$ each independently represents —SO-Z, —SO$_2$-Z, —SO$_2$NR$_1$R$_2$, a sulfo group, —CONR$_1$R$_2$ or —CO$_2$R$_1$. Among these substituents, preferred are —SO-Z, —SO$_2$-Z, —SO$_2$NR$_1$R$_2$ and —CONR$_1$R$_2$, more preferred are —SO$_2$-Z and —SO$_2$NR$_1$R$_2$, and most preferred is —SO$_2$-Z. In the case where any one of $a_1$ to $a_4$ showing the number of substituent represents a number of 2 or more, the plurality of substituents $X_1$, $X_2$, $X_3$ or $X_4$ may be the same or different and each independently represents any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —SO$_2$-Z and Zs are different from each other, or may include substituents different from each other, for example, —SO$_2$-Z and —SO$_2$NR$_1$R$_2$.

In the above, each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, a substituted or unsubstituted heterocyclic group, more preferably a hydrogen atom, a substituted alkyl group, a substituted aryl group or a substituted heterocyclic group. However, it is not preferred that $R_1$ and $R_2$ both are a hydrogen atom.

The substituted or unsubstituted alkyl group represented by $R_1$, $R_2$ and Z is preferably an alkyl group having from 1 to 30 carbon atoms, more preferably a branched alkyl group because the solubility of dye and the stability of ink are improved, and particularly preferably an alkyl group having an asymmetric carbon (use in the racemic form). Examples of the substituent include those described below as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkyl group may have a halogen atom or an ionic hydrophilic group. Incidentally, the number of carbon atoms in the alkyl group does not contain carbon atoms of substituents and this applies to other groups.

The substituted or unsubstituted cycloalkyl group represented by $R_1$, $R_2$ and $Z$ is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described below as the substituent when $Z$, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may have a halogen atom or an ionic hydrophilic group.

The substituted or unsubstituted alkenyl group represented by $R_1$, $R_2$ and $Z$ is preferably an alkenyl group having from 2 to 30 carbon atoms, more preferably a branched alkenyl group because the solubility of dye and the stability of ink are improved, and particularly preferably an alkenyl group having an asymmetric carbon (use in the racemic form). Examples of the substituent include those described below as the substituent when $Z$, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkenyl group may have a halogen atom or an ionic hydrophilic group.

The substituted or unsubstituted aralkyl group represented by $R_1$, $R_2$ and $Z$ is preferably an aralkyl group having from 7 to 30 carbon atoms, more preferably a branched aralkyl group because the solubility of dye and the stability of ink are improved, and particularly preferably an aralkyl group having an asymmetric carbon (use in the racemic form). Examples of the substituent include those described below as the substituent when $Z$, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the aralkyl group may have a halogen atom or an ionic hydrophilic group.

The substituted or unsubstituted aryl group represented by $R_1$, $R_2$ and $Z$ is preferably an aryl group having from 6 to 30 carbon atoms. Examples of the substituent include those described below as the substituent when $Z$, $R_1$, $R_2$, $Y_1$, $Y_2$, $Y_3$ and $Y_4$ can further have a substituent. In particular, an electron withdrawing group is preferred because the dye can be noble in the oxidation potential and improved in the fastness. Examples of the electron withdrawing group include those having a positive Hammett's substituent constant $\sigma p$ value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by $R_1$, $R_2$ and $Z$ is preferably a 5- or 6-membered ring and the ring may be further condensed. Also, the heterocyclic group may be an aromatic heterocyclic group or a non-aromatic heterocyclic group. Examples of the heterocyclic group represented by $R_1$, $R_2$ and $Z$ are shown below in the form of a heterocyclic ring by omitting the substitution site. The substitution site is not limited and for example, pyridine may be substituted at the 2-position, 3-position and 4-position. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described below as the substituent when $Z$, $R_1$, $R_2$, $Y_1$, $Y_2$, $Y_3$ and $Y_4$ can further have a substituent. Preferred substituents are the same as the above-described substituents of the aryl group and more preferred substituents are the same as the above-described more preferred substituents of the aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These substituents each may further have a substituent.

Among these, preferred are a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group and a sulfo group, more preferred are a hydrogen atom, a halogen atom, a cyano group, a carboxyl group and a sulfo group, and most preferred is a hydrogen atom.

When $Z$, $R_1$, $R_2$, $Y_1$, $Y_2$, $Y_3$ and $Y_4$ each is a group which can further have a substituent, the group may further have the following substituent.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each preferably a group having a branched chain because the solubility of dye and the stability of ink are improved, more preferably a group having an asymmetric carbon; specific examples of these groups include methyl, ethyl, propyl, isopropyl, sec-butyl, tert-butyl, 2-ethylhexyl, 2-methylsulfonylethyl, 3-phenoxypropyl, trifluoromethyl and cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (I) is water-soluble, the dye preferably has an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidinium ion, tetramethylphosphonium). Among these counter ions, an alkali metal salt is preferred and a lithium salt is more preferred because this salt enhances the solubility of dye and improves the stability of ink.

As for the number of ionic hydrophilic groups, the phthalocyanine dye preferably has at least two ionic hydrophilic groups, more preferably at least two sulfo groups and/or carboxyl groups, within one molecule.

$a_1$ to $a_4$ and $b_1$ to $b_4$ represent the numbers of substituents $X_1$ to $X_4$ and $Y_1$ to $Y_4$, respectively. $a_1$ to $a_4$ each independently represents an integer of 0 to 4 but the case where $a_1$ to $a_4$ all are 0 at the same time is excluded. $b_1$ to $b_4$ each independently represents an integer of 0 to 4. When any one of $a_1$ to $a_4$ and $b_1$ to $b_4$ is an integer of 2 or more, any one of $X_1$ to $X_4$ and $Y_1$ to $Y_4$ is present in a plural number and the plurality of substituents may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship between $a_1$ and $b_1$ is present in each of the combinations $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl. M is more preferably Cu, Ni, Zn or Al, and most preferably Cu.

Also, Pc (phthalocyanine ring) may form a dimer (for example, Pc-M-L-M-Pc) or a trimer through L (a divalent linking group). At this time, Ms may be the same or different.

The divalent linking group represented by L is preferably an oxy group —O—, a thio group —S—, a carbonyl group —CO—, a sulfonyl group —SO$_2$—, an imino group —NH—, a methylene group —CH$_2$— or a group formed by combining two or more of these groups.

As for the preferred combination of substituents in the compound represented by formula (I), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (I), a phthalocyanine dye having a structure represented by formula (II) is preferred. The phthalocyanine structure represented by formula (II) of the present invention is described in detail below.

In formula (II), $X_{11}$ to $X_{14}$ and $Y_{11}$ to $Y_{18}$ have the same meanings as $X_1$ to $X_4$ and $Y_1$ to $Y_4$ in formula (I), respectively, and preferred examples are also the same. M has the same meaning as M in formula (I) and preferred examples are also the same.

In formula (II), $a_{11}$ to $a_{14}$ each independently represents an integer of 1 or 2 and preferably satisfy $4 \leq a_{11}+a_{12}+a_{13}+a_{14} \leq 6$, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_{13}$ and $X_{14}$ all are —SO$_2$-Z and Zs are different from each other, or may include substituents different from each other, for example, —SO$_2$-Z and —SO$_2$NR$_1$R$_2$.

In the phthalocyanine dye represented by formula (II), the following combination of substituents is particularly preferred.

$X_{11}$ to $X_{14}$ each independently represents preferably —SO-Z, —SO$_2$-Z, —SO$_2$NR$_1$R$_2$ or —CONR$_1$R$_2$, more preferably —SO$_2$Z or —SO$_2$NR$_1$R$_2$, most preferably —SO$_2$-Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$R_1$ and $R_2$ each independently represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group. However, it is not preferred that $R_1$ and $R_2$ both are a hydrogen atom. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{11}$ to $Y_{18}$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is particularly preferred that all are 1.

M represents a hydrogen atom, a metal element or an oxide, hydroxide or halide thereof, more preferably Cu, Ni, Zn or Al, and most preferably Cu.

In the case where the phthalocyanine dye represented by formula (II) is water-soluble, the dye preferably has an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidinium ion, tetramethylphosphonium). Among these counter ions, an alkali metal salt is preferred and a lithium salt is more preferred because this salt enhances the solubility of dye and improves the stability of ink.

As for the number of ionic hydrophilic groups, the phthalocyanine dye preferably has at least two ionic hydrophilic groups, more preferably at least two sulfo groups and/or carboxyl groups, within one molecule.

As for the preferred combination of substituents in the compound represented by formula (II), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye of the present invention, at least one electron withdrawing group such as sulfinyl group, sulfonyl group and sulfamoyl group is preferably introduced into respective four benzene rings of phthalocyanine so that the total of σp values of the substituents in the entire phthalocyanine skeleton can be 1.6 or more.

The Hammett's substituent constant σp value is briefly described. The Hammett's rule is a rule of thumb advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler) *Lange's Handbook of Chemistry*, 12th ed., McGraw-Hell (1979), and *Kagakuno Ryoiki* (*Chemistry Region*), special number, No. 122, pp. 96–103, Nankodo (1979).

Generally, in view of the synthesis method, the phthalocyanine derivative represented by formula (I) is inevitably a mixture of analogues differing in the site where the substituents Xn (n=1 to 4) and Ym (m=1 to 4) are introduced and in the number of the substituents introduced. Accordingly, these analogue mixtures are statically averaged and represented by a formula in many cases. In the present invention, it has been found that when these analogue mixtures are classified into the following three types, a specific mixture is particularly preferred. The phthalocyanine-base dye analogue mixtures represented by formulae (I) and (II) are defined by classifying these into the following three types based on the substitution site.

(1) β-Position Substitution Type:

A phthalocyanine dye having specific substituents at the 2- and/or 3-position, the 6- and/or 7-position, the 10-and/or 11-position, and the 14- and/or 15-position.

(2) α-Position Substitution Type:

A phthalocyanine dye having specific substituents at the 1- and/or 4-position, the 5- and/or 8-position, the 9-and/or 12-position, and the 13- and/or 16-position.

(3) α,β-Position Mixed Substitution Type:

A phthalocyanine dye having specific substitutions at the 1- to 16-positions without any regularity.

In the present invention, phthalocyanine dye derivatives different in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine—Kagaku to Kino—(Phthalocyanine—Chemistry and Function—)*, pp. 1–62, IPC, and C. C. Leznoff and A. B. P. Lever, *Phthalocyanines—Properties and Applications*, pp. 1–54, VCH, or methods analogous thereto.

The phthalocyanine compound represented by formula (I) of the present invention can be synthesized, for example, through sulfonation, sulfonyl chloridation and amidation of an unsubstituted phthalocyanine compound as described in International Patents 00/17275, 00/08103, 00/08101 and 98/41853 and JP-A-10-36471. In this case, sulfonation may take place at any site of the phthalocyanine nucleus and the number of sites sulfonated is difficult to control. Accordingly, when a sulfo group is introduced under such reaction conditions, the site and number of sulfo groups introduced into the product cannot be specified and a mixture of those different in the number of substituents or in the substitution site inevitably results. If the compound of the present invention is synthesized starting from such a product, the compound of the present invention is obtained as an α,β-position mixed substitution type mixture containing several kinds of compounds different in the number of substituents or in the substitution site because the number of sulfamoyl groups substituted on the heterocyclic ring or their substitution sites cannot be specified.

As described above, for example, when many electron withdrawing groups such as sulfamoyl group are introduced into the phthalocyanine nucleus, the oxidation potential becomes nobler and the ozone resistance is increased. However, according to the above-described synthesis method, a phthalocyanine dye where the number of electron withdrawing groups introduced is small, namely, the oxidation potential is baser, is inevitably mingled. Accordingly, in order to improve the ozone resistance, it is preferred to use a synthesis method where the production of a compound having a baser oxidation potential is suppressed.

For example, the phthalocyanine compound represented by formula (II) of the present invention can be synthesized by reacting a phthalonitrile derivative (Compound P) shown below and/or a diiminoisoindoline derivative (Compound Q) shown below with a metal derivative represented by formula (III) or may be derived from a tetrasulfophthalocyanine compound obtained by reacting a 4-sulfophthalonitrile derivative (Compound R) shown below with a metal derivative represented by formula (III).

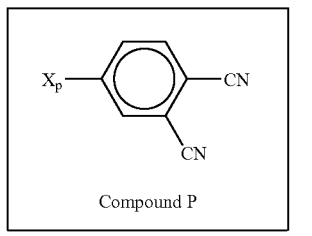

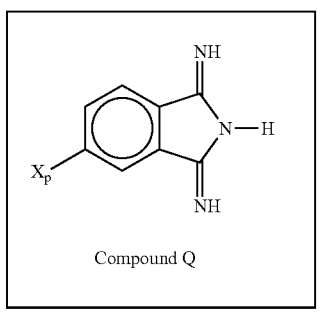

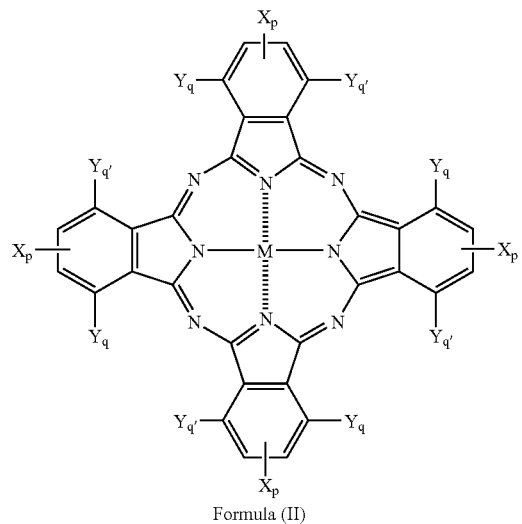

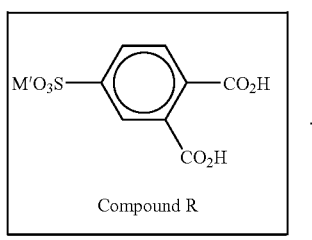

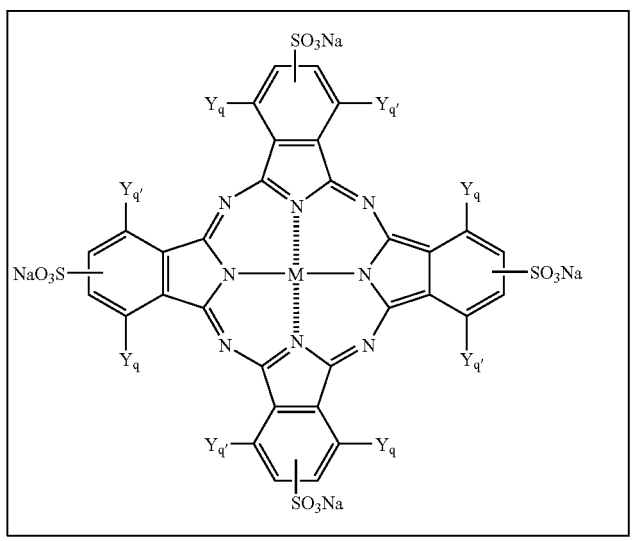

In the formulae above, $X_p$ corresponds to $X_{11}$, $X_{12}$, $X_{13}$ or $X_{14}$ in formula (II) and $Y_q$ and $Y_{q'}$ each corresponds to $Y_{11}$, $Y_{12}$, $Y_{13}$, $Y_{14}$, $Y_{15}$, $Y_{16}$, $Y_{17}$ or $Y_{18}$ in formula (II). In Compound R, M' represents cation.

Examples of the cation represented by M' include alkali metal ion such as Li, Na and K, and organic cation such as triethylammonium ion and pyridinium ion.

$$M\text{-}(Y)_d \quad\quad\quad (III)$$

wherein M has the same meaning as M in formulae (I) and (II), Y represents a monovalent or divalent ligand such as halogen atom, acetate anion, acetylacetonate and oxygen, and d represents an integer of 1 to 4.

That is, according to this synthesis method, a specific number of desired substituents can be introduced. Particularly, in the case of introducing a large number of electron withdrawing groups so as to render the oxidation potential nobler as in the present invention, this synthesis method is very excellent as compared with the above-described method for synthesizing the phthalocyanine compound of formula (I).

The thus-obtained phthalocyanine compound represented by formulae (II) is usually a mixture of compounds represented by the following formulae (a)-1 to (a)-4 which are isomers in respect to the substitution site of each $X_p$, namely, a β-position substitution type.

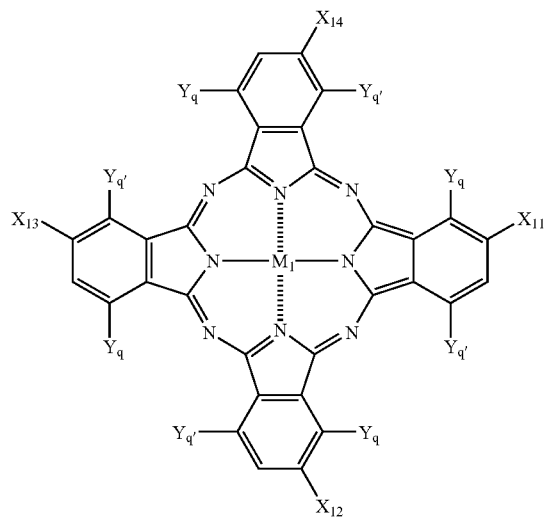

(a)-2

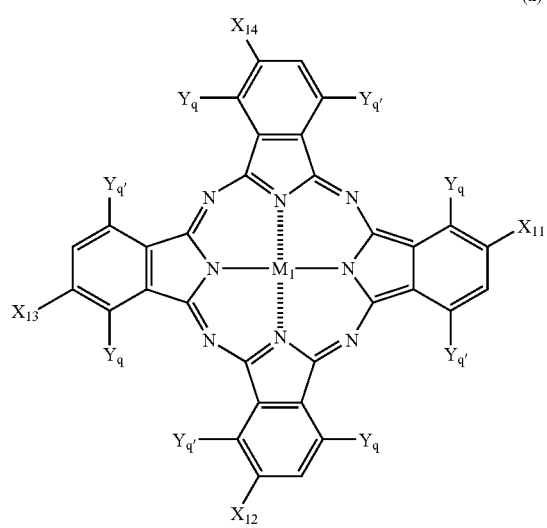

(a)-3

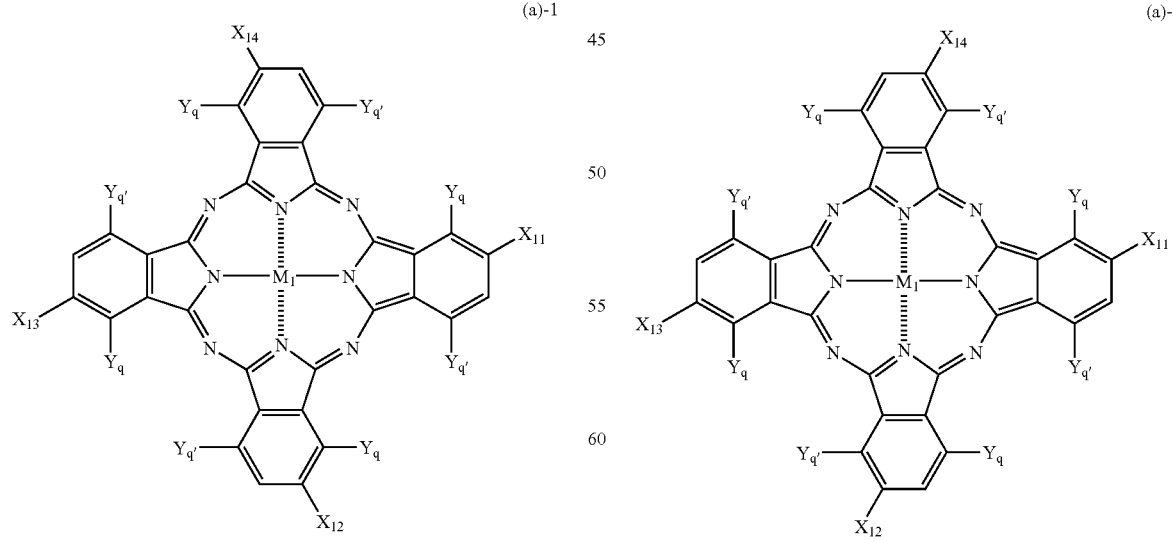

(a)-1

(a)-4

In the synthesis method above, when all Xp are the same, a β-position substitution type phthalocyanine dye where $X_{11}$, $X_{12}$, $X_{13}$ and $X_{14}$ are completely the same substituents can be obtained. On the other hand, when Xp are different, a dye having substituents of the same kind but partially different from each other or a dye having substituents different from each other can be synthesized. Among the dyes of formula (II), these substituents having electron withdrawing substituents different from each other are preferred because the solubility and aggregating property of dye and the aging stability of ink can be controlled.

In the present invention, it has been found very important in any substitution type for the improvement of fastness that the oxidation potential is nobler than 1.0 V (vs SCE). The importance of this effect cannot be anticipated at all from the above-described known techniques. Furthermore, although the cause is not particularly known, there is a tendency that the β-position substitution type out of those types is apparently more excellent in the color, light fastness, ozone gas resistance and the like than the α,β-position mixed substitution type.

Specific examples (Compounds I-1 to I-12 and 101 to 190) of the phthalocyanine dyes represented by formulae (I) and (II) are set forth below, however, the phthalocyanine dye for use in the present invention is not limited to the following examples.

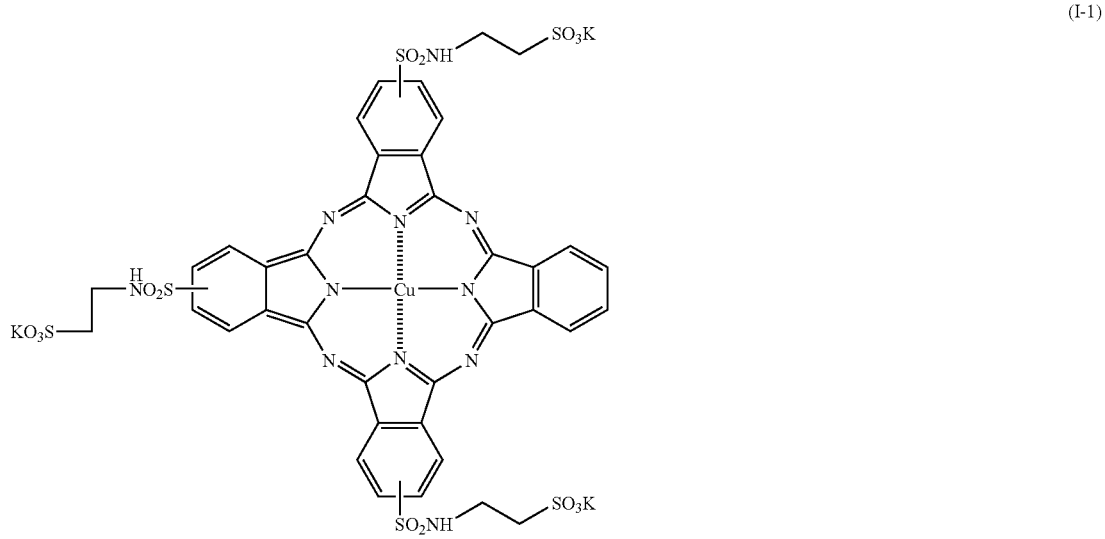

(I-1)

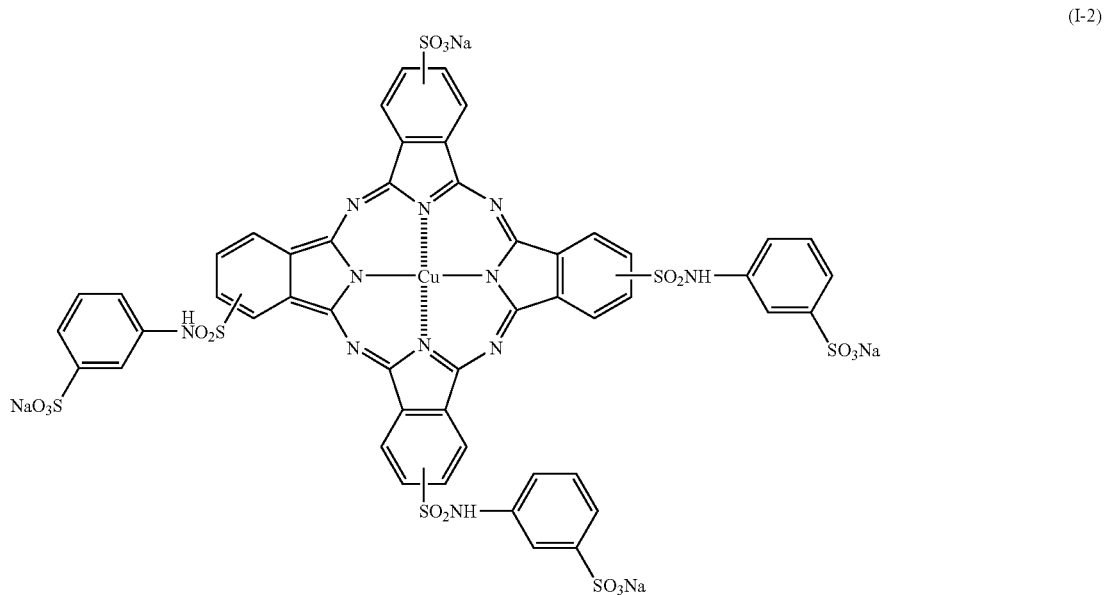

(I-2)

-continued
(I-3)
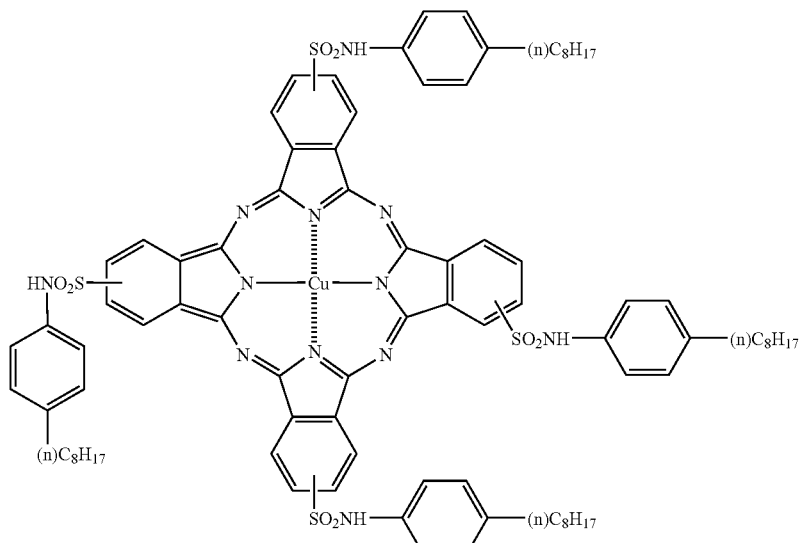
(I-4)
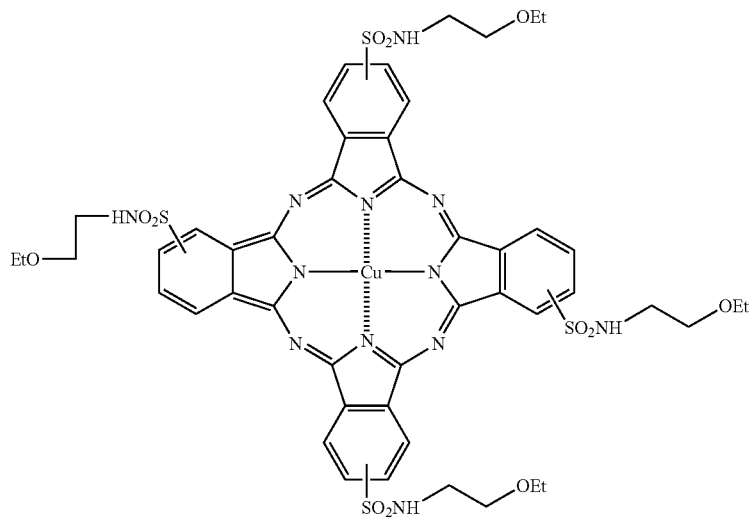
(I-5)
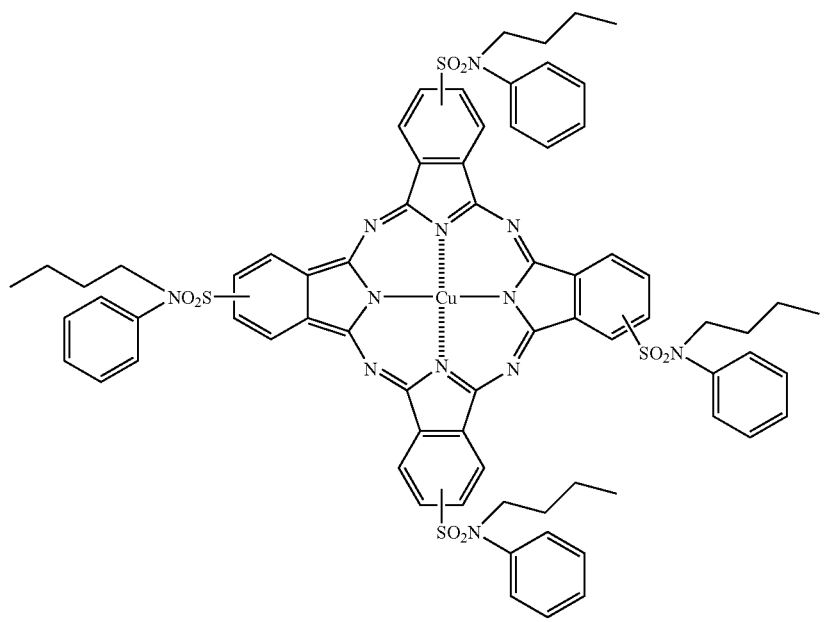

(I-6)
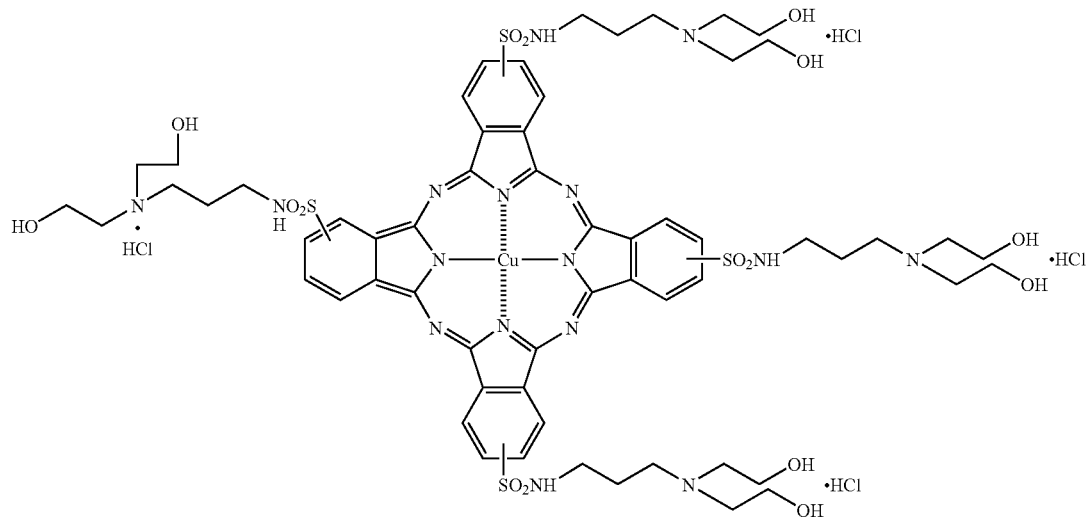
(I-7)
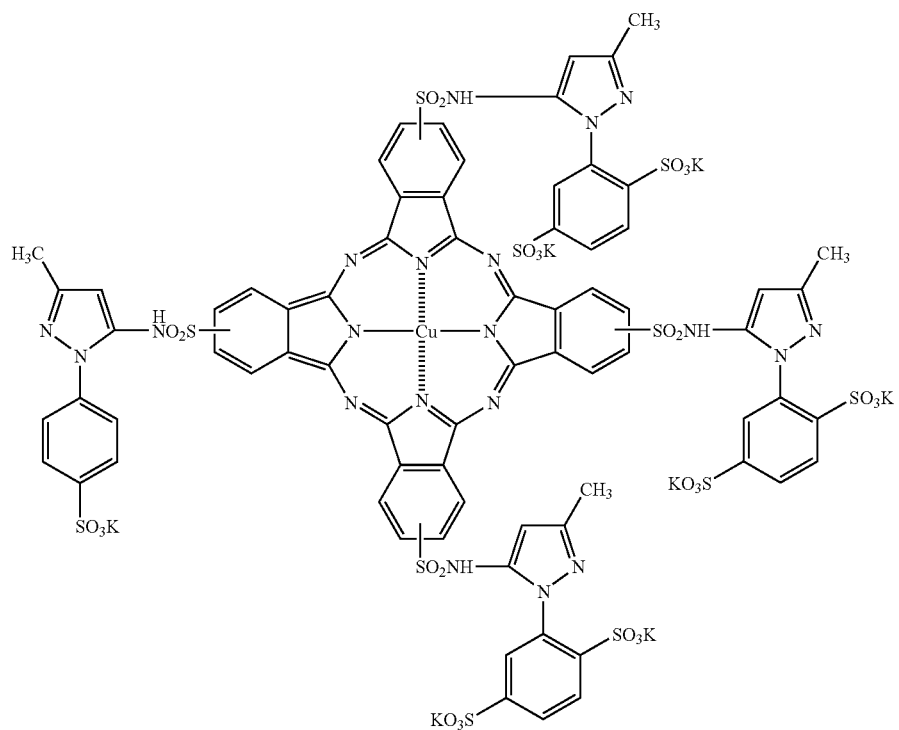

(I-8)
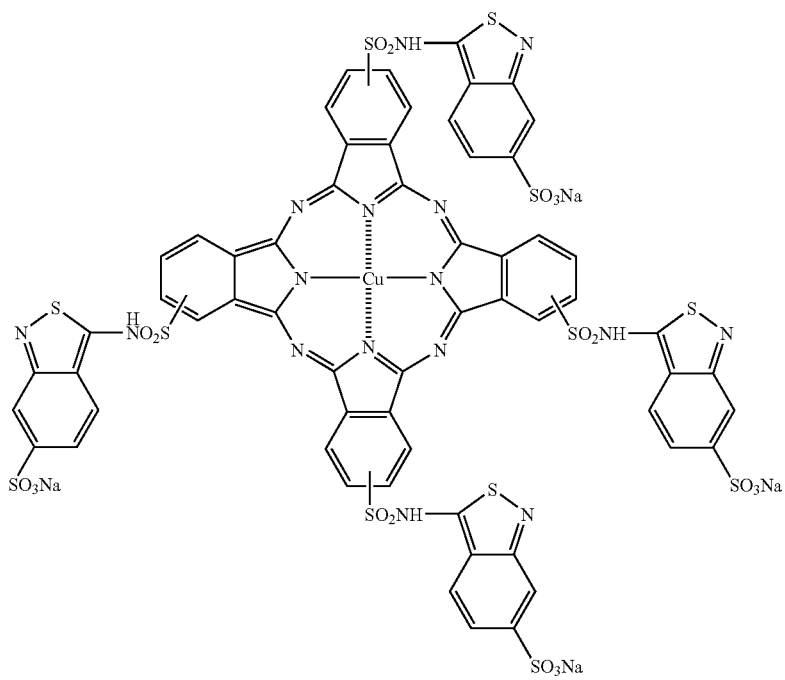
(I-9)
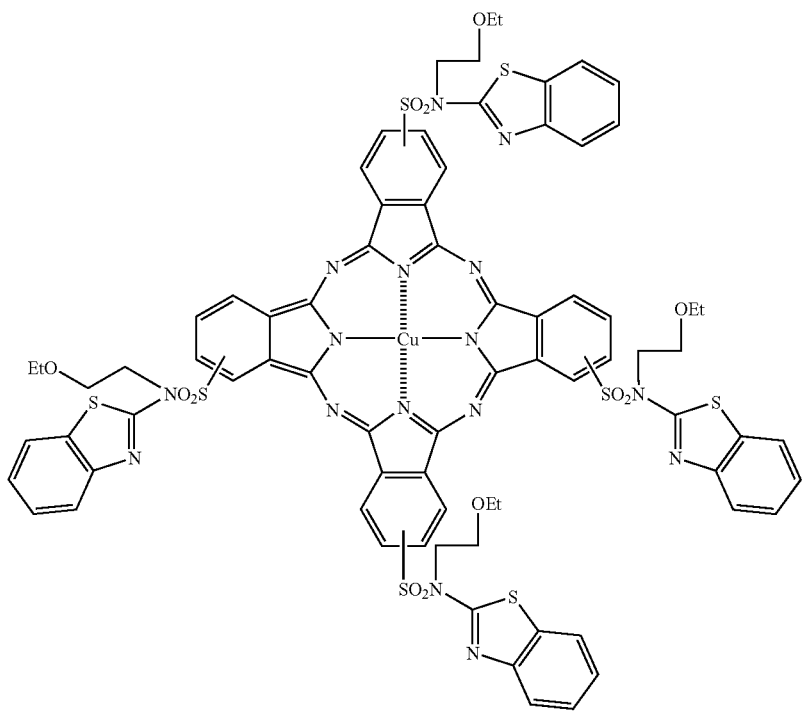

(I-10)
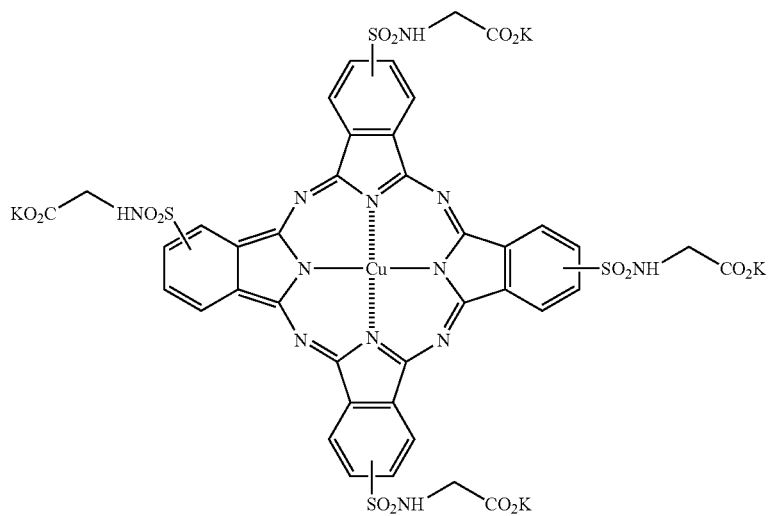
(I-11)
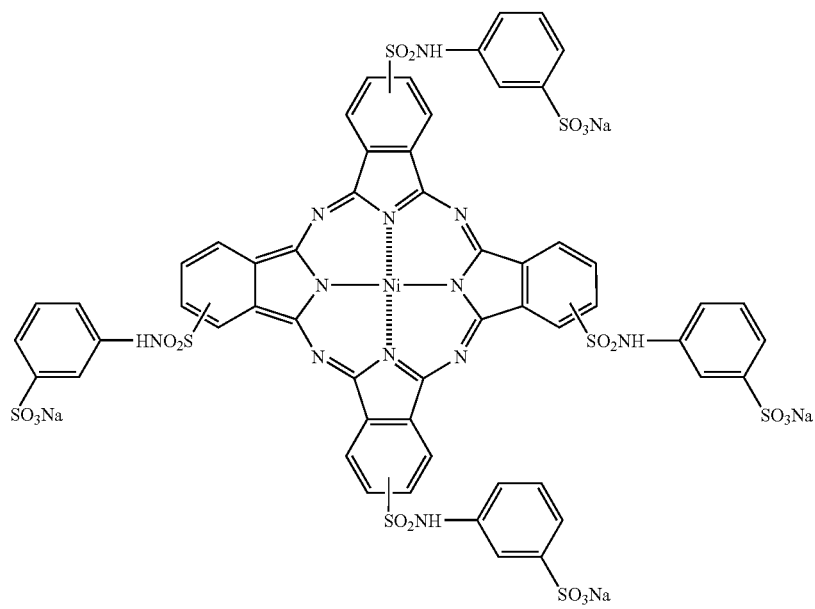
(I-12)
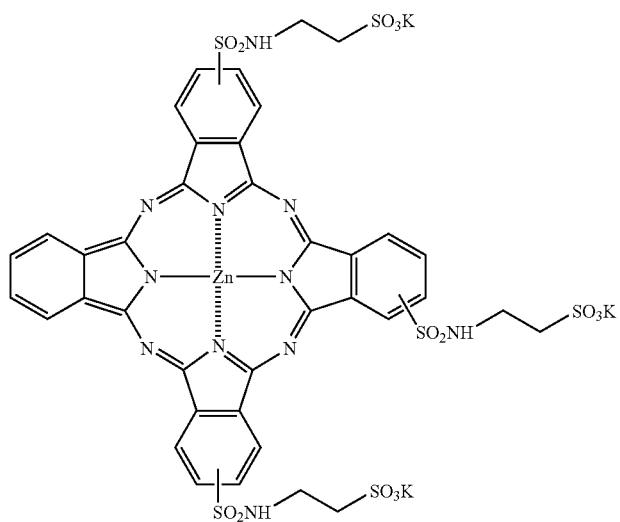

In the following Tables, specific examples of each pair of $(X_1, X_2)$, $(Y_{11}, Y_{12})$, $(Y_{13}, Y_{14})$, $(Y_{15}, Y_{16})$ and $(Y_{17}, Y_{18})$ are independently in an irregular order.

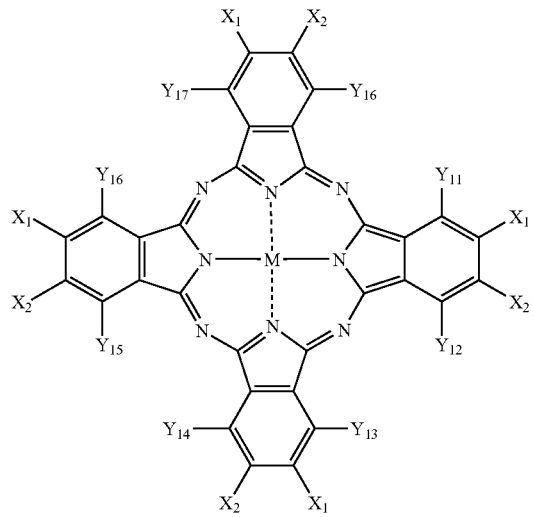

| No. | M | $X_1$ |
|---|---|---|
| 101 | Cu | $-SO_2-NH-CH_2-CH_2-SO_3Li$ |
| 102 | Cu | $-SO_2-NH-CH_2-CH(OH)-CO-NH-CH_2CH_2-SO_3Na$ |
| 103 | Cu | $-SO_2-NH-CH_2-CH_2-CH_2-SO_2NH-CH_2CH(OH)-SO_3Li$ |
| 104 | Cu | $-SO_2-NH-C_6H_4-SO_2NH-CH_2CH_2-SO_3Li$ |
| 105 | Ni | $-SO_2-NH-CH_2-CH_2-CO-NH-CH(CH_2-COONa)-COONa$ |
| 106 | Cu | $-SO_2-NH-CH_2-CH_2-SO_2-NH-CH_2-COONa$ |
| 107 | Cu | $-SO_2-CH_2-CH_2-CH_2-SO_2-NH-CH(CH_2-OH)-COOLi$ |
| 108 | Cu | $-SO_2CH_2-CH_2-CH_2-SO_3Li$ |
| 109 | Cu | $-SO_2CH_2-CH_2-CH_2-SO_3K$ |
| 110 | Cu | $-SO_2-(CH_2)_5-CO_2K$ |
| 111 | Cu | $-SO_2-NH-CH_2-CH_2-CH_2-SO_2-NH-CH_2CH(OH)-CH_2-SO_3Li$ |
| 112 | Cu | $-SO_2-NH-CH_2-CH_2-CH_2-SO_2NH-CH_2-CH(OH)-CH_3$ |
| 113 | Cu | $-SO_2-CH_2-CH(OH)-CH_2SO_3K$ |

-continued

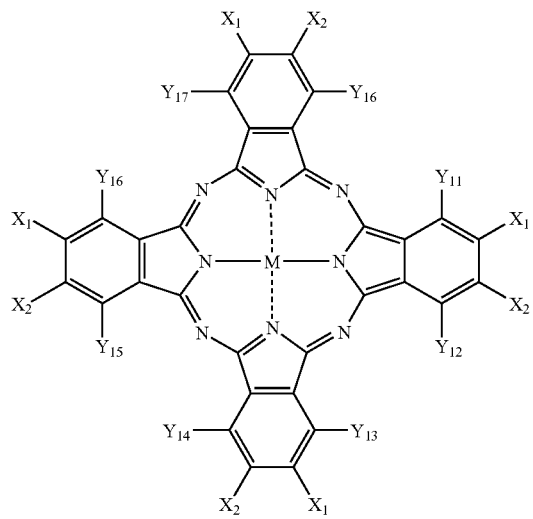

| 114 | Cu | —SO$_2$—CH$_2$—CH(OH)—CH$_3$ |
| --- | --- | --- |
| 115 | Cu | —SO$_2$NH(CH$_2$)$_3$⁺N(CH$_3$)(CH$_2$CH$_2$OH)$_2$ · CH$_3$—C$_6$H$_4$—SO$_3$⁻ |
| 116 | Cu | —CO—NH—CH$_2$—CH(OH)—CH$_2$SO$_3$K |
| 117 | Cu | —CO—NH—CH(COOLi)—CH$_2$CH$_2$SO$_3$Li |
| 118 | Cu | —SO$_2$CH$_2$CH$_2$CH(CH$_3$)(SO$_3$Li) |
| 119 | Cu | —SO$_2$—CH$_2$—CH(OH)—CH$_2$—SO$_3$Na |
| 120 | Cu | —SO$_2$—CH$_2$—CH$_2$—CH(CH$_3$)—COOLi |
| 121 | Cu | —SO$_2$(CH$_2$)$_3$SO$_2$NHCH$_2$—CH(OH)—CH$_2$—SO$_3$Li |
| 122 | Cu | —CO$_2$CH$_2$CH$_2$CH$_2$SO$_2$—NH—CH$_2$—CH(OH)—CH$_2$—SO$_3$Li |
| 123 | Cu | —SO$_2$NH—C$_8$H$_{17}$(t) |
| 124 | Cu | —SO$_2$—NH—CH$_2$—CH(CH$_2$CH$_3$)—CH$_2$CHCH$_2$—CH$_3$ |
| 125 | Cu | —SO$_2$CH$_2$CH$_2$CH$_2$SO$_2$—NH—CH$_2$—CH(CH$_3$)—CH$_2$—CH$_3$ |

-continued
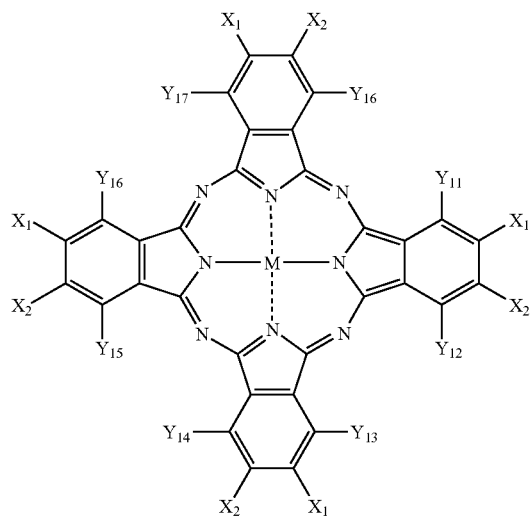
| | | |
|---|---|---|
| 126 | Cu | 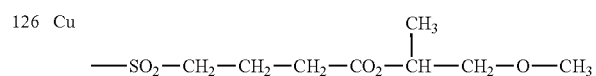 —SO₂—CH₂—CH₂—CH₂—CO₂—CH(CH₃)—CH₂—O—CH₃ |
| 127 | Cu | 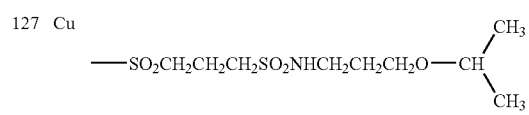 —SO₂CH₂CH₂CH₂SO₂NHCH₂CH₂CH₂O—CH(CH₃)₂ |
| 128 | Cu | 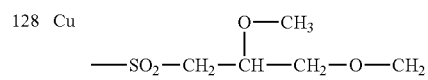 —SO₂—CH₂—CH(OCH₃)—CH₂—O—CH₂ |
| 129 | Cu | 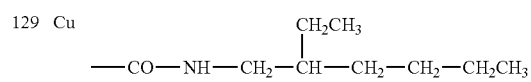 —CO—NH—CH₂—CH(CH₂CH₃)—CH₂—CH₂—CH₂CH₃ |
| 130 | Cu | 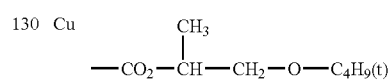 —CO₂—CH(CH₃)—CH₂—O—C₄H₉(t) |
| 131 | Cu | 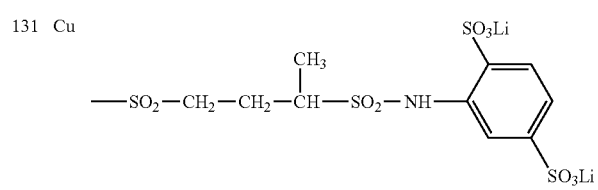 |
| 132 | Cu | 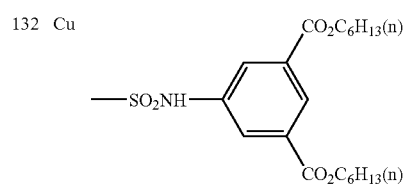 |
| 133 | Cu | 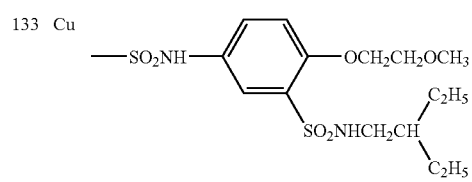 |

-continued
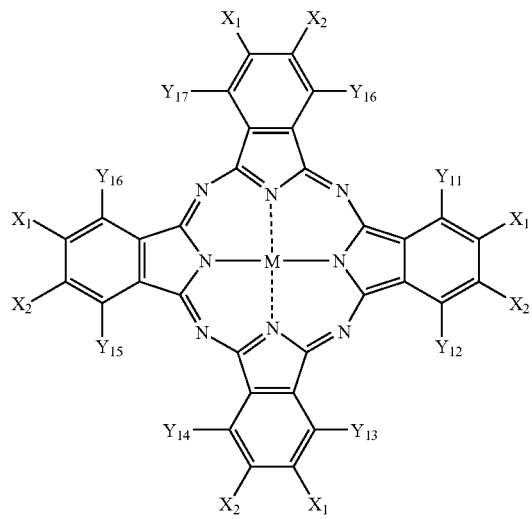
134 Cu 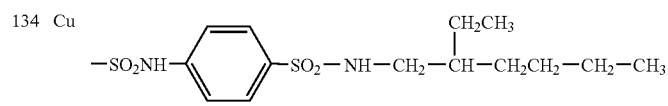
135 Cu 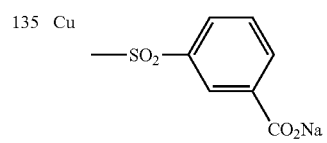
136 Cu 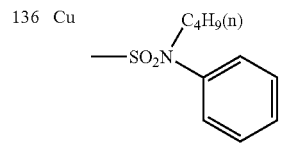
137 Cu 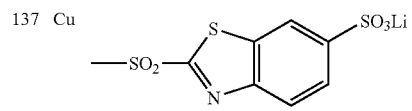
138 Cu 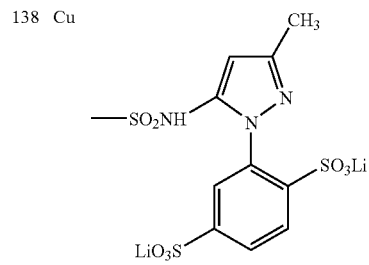
139 Cu 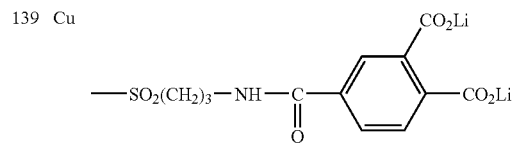

-continued
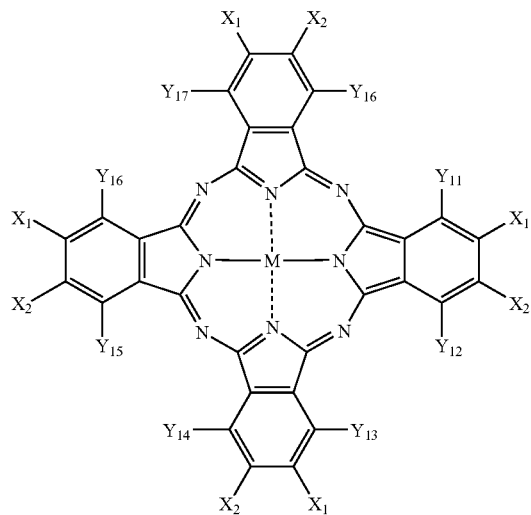
| | | |
|---|---|---|
| 140 | Cu | 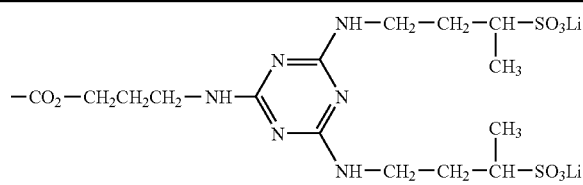 |
| 141 | Cu | 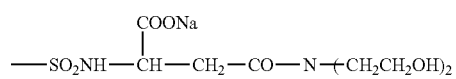 |
| 142 | Cu | 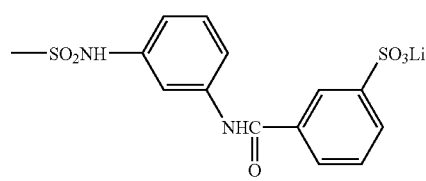 |
| 143 | Cu | 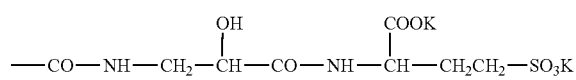 |
| 144 | Cu | 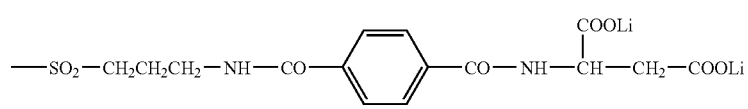 |
| 145 | Cu | —SO$_2$CH$_2$CH$_2$OCH$_2$CH$_2$OCH$_2$CH$_2$SO$_3$Li |
| No. | X$_2$ | Y$_{11}$, Y$_{12}$ | Y$_{13}$, Y$_{14}$ | Y$_{15}$, Y$_{16}$ | Y$_{17}$, Y$_{18}$ |
|---|---|---|---|---|---|
| 101 | —H | —H, —H | —H, —H | —H, —H | —H, —H |
| 102 | —H | —Cl, —H | —Cl, —H | —Cl, —H | —Cl, —H |
| 103 | —H | —H, —H | —H, —H | —H, —H | —H, —H |
| 104 | —H | —H, —H | —H, —H | —H, —H | —H, —H |
| 105 | —H | —Cl, —H | —Cl, —H | —Cl, —H | —Cl, —H |
| 106 | —CN | —H, —H | —H, —H | —H, —H | —H, —H |
| 107 | —H | —H, —H | —H, —H | —H, —H | —H, —H |
| 108 | —H | —H, —H | —H, —H | —H, —H | —H, —H |
| 109 | —H | —H, —H | —H, —H | —H, —H | —H, —H |

-continued
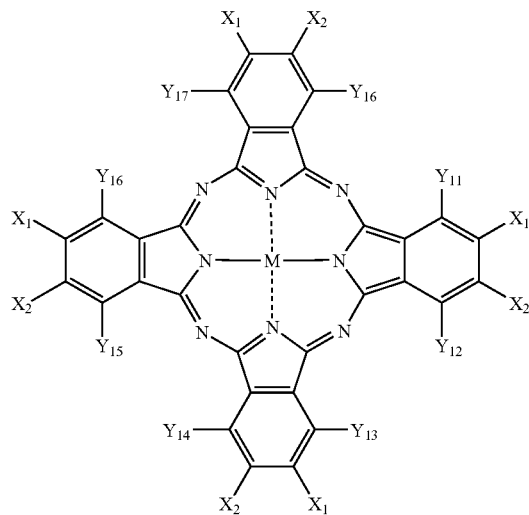
| | X₁ | X₂ |
|---|---|---|
| 110 | —H | —H, —H  —H, —H  —H, —H  —H, —H |
| 111 | —H | —H, —H  —H, —H  —H, —H  —H, —H |
| 112 | —SO₃Li | —H, —H  —H, —H  —H, —H  —H, —H |
| 113 | —H | —H, —H  —H, —H  —H, —H  —H, —H |
| 114 | —SO₃Li | —H, —H  —H, —H  —H, —H  —H, —H |
| 115 | —H | —H, —H  —H, —H  —H, —H  —H, —H |
| 116 | —H | —H, —H  —H, —H  —H, —H  —H, —H |
| 117 | —H | —H, —H  —H, —H  —H, —H  —H, —H |
| 118 | —H | —H, —H  —H, —H  —H, —H  —H, —H |
| 119 | —H | —H, —H  —H, —H  —H, —H  —H, —H |
| 120 | —H | —H, —H  —H, —H  —H, —H  —H, —H |
| 121 | —H | —H, —H  —H, —H  —H, —H  —H, —H |
| 122 | —H | —H, —H  —H, —H  —H, —H  —H, —H |
| 123 | —H | —H, —H  —H, —H  —H, —H  —H, —H |
| 124 | —H | —H, —H  —H, —H  —H, —H  —H, —H |
| 125 | —H | —H, —H  —H, —H  —H, —H  —H, —H |
| 126 | —H | —H, —H  —H, —H  —H, —H  —H, —H |
| 127 | —H | —H, —H  —H, —H  —H, —H  —H, —H |
| 128 | —CN | —H, —H  —H, —H  —H, —H  —H, —H |
| 129 | —H | —Cl, —H  —Cl, —H  —Cl, —H  —Cl, —H |
| 130 | —H | —H, —H  —H, —H  —H, —H  —H, —H |
| 131 | —H | —H, —H  —H, —H  —H, —H  —H, —H |
| 132 | —H | —H, —H  —H, —H  —H, —H  —H, —H |
| 133 | —H | —H, —H  —H, —H  —H, —H  —H, —H |
| 134 | —H | —H, —H  —H, —H  —H, —H  —H, —H |
| 135 | —H | —H, —H  —H, —H  —H, —H  —H, —H |

-continued

[Structure: M-phthalocyanine with positions X₁, X₂, Y₁₁–Y₁₇]

| No. | X₁ | X₂ | Y positions |
|---|---|---|---|
| 136 | —H | —H, —H | —H, —H  —H, —H  —H, —H |
| 137 | —H | —H, —H | —H, —H  —H, —H  —H, —H |
| 138 | —H | —H, —H | —H, —H  —H, —H  —H, —H |
| 139 | —Cl | —H, —H | —H, —H  —H, —H  —H, —H |
| 140 | —H | —H, —H | —H, —H  —H, —H  —H, —H |
| 141 | —H | —H, —H | —H, —H  —H, —H  —H, —H |
| 142 | —H | —H, —H | —H, —H  —H, —H  —H, —H |
| 143 | —H | —H, —H | —H, —H  —H, —H  —H, —H |
| 144 | —H | —H, —H | —H, —H  —H, —H  —H, —H |
| 145 | —H | —H, —H | —H, —H  —H, —H  —H, —H |

40

In the following Tables, each introduction site of substituents ($R_1$) and ($R_2$) is in an irregular order within the β-position substitution type.

| | $M-Pc(R_1)_m(R_2)_n$ | | |
|---|---|---|---|
| No. | M | $R_1$ | m |
| 146 | Cu | —SO₂—NH—CH₂—CH(CH₃)—SO₃Li | 3 |
| 147 | Cu | —SO₂—NH—CH₂—CH₂SO₃Li | 3 |
| 148 | Cu | —SO₂—NH—CH₂—CH(CH₃)—SO₃Li | 3 |
| 149 | Cu | —SO₂—NH—CH₂—CH(CH₃)—SO₃Li | 2 |
| 150 | Cu | —SO₂—NH—CH₂—CH₂—SO₂—NH—CH₂CH₂—COONa | 3 |

-continued

| | | M—Pc(R₁)ₘ(R₂)ₙ | |
|---|---|---|---|
| 151 | Cu | —SO₂—NH—⟨C₆H₄⟩—SO₂NH—CH₂—CH(OH)—SO₃Li | 3 |
| 152 | Cu | —SO₂—CH₂—CH₂—CH(CH₃)—SO₃Li | 2.5 |
| 153 | Cu | —SO₂—CH₂—CH₂—CH(CH₃)—SO₃Na | 2 |
| 154 | Cu | —SO₂—CH₂—CH₂—CH₂—SO₃Li | 3 |
| 155 | Cu | —SO₂CH₂—CH₂—CH₂—COOK | 2 |
| 156 | Cu | —SO₂CH₂—CH₂—CH₂—SO₃Li | 3 |
| 157 | Cu | —SO₂CH₂—CH₂—O—CH₂—CH₂—SO₃Li | 2 |
| 158 | Cu | —SO₂—CH₂—CH(OH)—CH₂—SO₃Li | 3 |
| 159 | Cu | —SO₂NHCH₂CH₂—SO₃Li | 3 |
| 160 | Cu | —SO₂—CH₂—CH₂—O—CH₂—CH₂—O—CH₂—CH₂—SO₃Na | 3 |
| 161 | Cu | —SO₂CH₂CH₂CH₂SO₃Li | 3 |
| 162 | Cu | —SO₂CH₂CH₂CH₂SO₃Li | 2 |
| 163 | Cu | —SO₂CH₂CH₂CH₂SO₃K | 3 |
| 164 | Cu | —SO₂CH₂CH₂CH₂SO₃Li | 2 |
| 165 | Cu | —CO—NH—CH₂—CH₂—SO₃K | 3 |
| 166 | Cu | —CO—NH—CH₂—CH₂—SO₂—NH—CH₂—CH₂—COONa | 3 |
| 167 | Cu | —SO₂(CH₂)₃SO₂NHCH₂—CH(OH)—CH₂CO₂Li | 2.5 |
| 168 | Cu | —CO₂—CH₂—CH₂—CH(CH₃)—SO₃Na | 2 |
| 169 | Cu | —CO₂—CH₂CH₂—CH₂—SO₃Li | 3 |
| 170 | Cu | —CO₂—CH₂—CH₂—CH₂COOK | 2 |
| 171 | Cu | —CO₂—CH₂—CH₂—O—CH₂—CH₂—O—CH₂—CH₂—SO₃Na | 3 |
| 172 | Cu | —SO₂CH₂CH₂OCH₂CH₂O—CH₂CH₂SO₃K | 2 |
| 173 | Cu | —SO₂(CH₂)₃SO₂NHCH₂CHCH₂OH, OH | 2 |
| 174 | Cu | —SO₂(CH₂)₃SO₂NHCH₂—CH(OH)—CH₂SO₃K | 3 |
| 175 | Cu | —SO₂(CH₂)₃SO₂NH(CH₂)₃N(CH₂CH₂OH)₂ | 2 |
| 176 | Cu | —SO₂—CH₂—CH₂—CH₂—SO₂—NH—CH₂—CH(OH)—CH₃ | 3 |
| 177 | Cu | —SO₂—CH₂—CH₂O—CH₂—CH₃—O—CH₃ | 2 |
| 178 | Cu | —SO₂—CH₂—CH₂—O—CH₂—CH₂—O—CH₂—CH₂—OH | 3 |
| 179 | Cu | —SO₂—CH₂—CH(CH₂CH₃)—CH₂CH₂—CH₂CH₃ | 2 |
| 180 | Cu | —SO₂—CH₂—CH₂—CH₂—SO₂—NH—CH₂—CH(OCH₃)—CH₃ | 3 |
| 181 | Cu | —SO₂—CH₂—CH₂—CH₂—CO₂—NH—CH(CH₃)—CH₂—CH₃ | 3 |

-continued

| | | M—Pc(R₁)ₘ(R₂)ₙ | |
|---|---|---|---|
| 182 | Cu | —SO₂—CH₂—CH₂—CH₂—SO₂NH—CH₂—CH(OH)—CH₃ | 2.5 |
| 183 | Cu | —SO₂—CH₂—CH₂—CH₂—CO₂—NH—CH(CH₃)—CH₂—CH₃ | 2 |
| 184 | Cu | —SO₂—CH₂—CH₂—CH₂—SO₂—NH—CH₂—CH(OH)—CH₃ | 3 |
| 185 | Cu | —SO₂—CH₂—CH₂—CH₂—SO₂—NH—CH₂—CH(OH)—CH₃ | 3 |
| 186 | Cu | —SO₂—CH₂—CH₂—CH₂—CO₂—NH—CH(CH₃)—CH₂—CH₃ | 3 |
| 187 | Cu | —SO₂—CH₂—CH₂—CH₂—SO₂—NH—CH(CH₃)₂ | 3 |
| 188 | Cu | —CO₂—CH₂—CH₂—CH₂—CO₂—NH—CH(CH₃)—CH₂—CH₃ | 3 |
| 189 | Cu | —CO—NH—CH₂—CH₂—SO₂—NH—CH(CH₃)₂ | 3 |
| 190 | Cu | —CO—NH—CH₂—CH(CH₂CH₃)—CH₂—CH₂—CH₃ | 3 |

| No. | R₂ | n |
|---|---|---|
| 146 | —SO₂—NH—CH₂—CH(OH)—CH₃ | 1 |
| 147 | —SO₂—NH—CH₂—CH₂—CH₂—SO₂—NH—CH₂—CH(OH)—CH₃ | 1 |
| 148 | —SO₂NH—CH₂—CH₂—CH₂—SO₂—NH—CH₂—CH₂—O—CH₂—CH₂—OH | 1 |
| 149 | —SO₂NH—CH₂—CH₂—CH₂—CO—N(CH₂—CH₂—OH)₂ | 2 |
| 150 | —SO₂NH—CH(CH₃)—CH₂OH | 1 |
| 151 | —SO₂NH—CH₂—CH₂—O—CH₂—CH₂—OH | 1 |
| 152 | —SO₂—CH₂—CH₂—O—CH₂—CH₂—OH | 1.5 |
| 153 | —SO₂CH₂—CH₂—CH₂—CO—N(CH₂—CH₂—CH₃)₂ | 2 |
| 154 | —SO₂—CH₂—CH₂—CH₂—SO₂—NH—CH₂—CH(OH)—CH₃ | 1 |
| 155 | —SO₂—CH₂—CH₂—CH₂—SO₂—NH—CH₂—CH(OH)—CH₂—COOK | 2 |
| 156 | —SO₂—CH₂—CH(OH)—CH₂—SO₃Li | 1 |
| 157 | —SO₂—CH₂—CH₂—CH₂—CO₂—CH₂—CH₂—CH(OH)—CH₂—COOK | 2 |

-continued

| | M—Pc(R₁)ₘ(R₂)ₙ | |
|---|---|---|
| 158 | —SO₂—CH₂—[C₆H₄]—SO₂NH—CH₂—CH(OH)—CH₂—OH | 1 |
| 159 | —SO₂—CH₂—CH₂—CH₂—SO₂—NH—CH₂—CH(OH)—CH₃ | 1 |
| 160 | —SO₂—CH₂—CH₂—CH₂—CO—N(CH₂—CH₂—COONa)(CH₂—COONa) | 1 |
| 161 | —SO₂CH₂CH₂CH₂SO₂NHCH₂—CH(OH)—CH₂SO₃Li | 1 |
| 162 | —SO₂CH₂CH₂OCH₂CH₂OCH₂CH₂OH | 2 |
| 163 | —SO₂CH₂CH₂CH₂SO₂NH—CH(CH₃)—CH₂—OH | 1 |
| 164 | —SO₂CH₂CH₂CH₂SO₂N(CH₂CH₂OH)₂ | 2 |
| 165 | —CO—NH—CH₂—CH₂—O—CH₂—CH₂—OH | 1 |
| 166 | —CO—NH—CH₂—CH(OH)—CH₃ | 1 |
| 167 | —CO—NH—CH₂—CH₂—CH₂—CO—N—(CH₂—CH₂—OH)₂ | 1.5 |
| 168 | —CO—CH₂—CH₂—CH₂—CO—N—(CH₂—CH₂—OH)₂ | 2 |
| 169 | —CO₂—CH₂—CH₂—CH₂—SO₂—NH—CH₂—CH(OH)—CH₃ | 1 |
| 170 | —CO₂—CH₂—CH₂—CH₂—SO₂—NH—CH₂—CH(OH)—CH₂—COOK | 2 |
| 171 | —CO₂—CH₂—[C₆H₄]—SO₂NH—CH₂—CH(OH)—CH₂—OH | 1 |
| 172 | —CO₂—CH₂—CH₂—CH₂—CO₂—CH₂—CH₂—CH(OH)—CH₂—COOK | 2 |
| 173 | —CO₂—CH₂—CH(OH)—CH₂—SO₃Li | 2 |
| 174 | —CO₂—CH₂—CH₂—CH₂—SO₂—NH—CH₂—CH(OH)—CH₃ | 1 |
| 175 | —CO₂—CH₂—CH₂—CH₂—CH₂—CO—N(CH₂—CH₂—COOLi)(CH₂—COOLi) | 2 |
| 176 | —SO₂—CH₂—CH₂—CH₂—SO₂—NH—CH₂—CH(CH₂CH₃)—CH₂CH₂—CH₂CH₃ | 1 |
| 177 | —SO₂—CH₂—CH₂—CH₂—SO₂—NH—CH₂—CH(OH)—CH₃ | 1 |

-continued

| | M—Pc(R$_1$)$_m$(R$_2$)$_n$ | |
|---|---|---|
| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| 179 | —SO$_2$—CH$_2$—CH$_2$—CH$_2$—SO$_2$—NH—CH$_2$—CH(O—CH$_3$)—CH$_3$ | 2 |
| 180 | —SO$_2$NH—CH$_2$—CH$_2$—SO$_2$NH—CH$_2$—CH$_2$—O—CH$_2$—CH$_2$—OH | 1 |
| 181 | —SO$_2$—CH$_2$—CH$_2$—CH$_2$—SO$_2$—NH—CH(CH$_3$)$_2$ | 1 |
| 182 | —SO$_2$—CH$_2$—CH$_2$—CH$_2$—CO$_2$—NH—CH(CH$_3$)—CH$_2$—CH$_3$ | 1.5 |
| 183 | —SO$_2$—CH$_2$—CH$_2$—CH$_2$—SO$_2$—NH—(CH$_2$)$_3$—CH$_2$—O—CH$_2$CH$_2$—OH | 2 |
| 184 | —SO$_2$—CH$_2$—CH$_2$—O—CH$_2$—CH$_2$—O—CH$_3$ | 1 |
| 185 | —SO$_2$—CH$_2$—CH$_2$—O—CH$_2$—CH$_2$—O—CH$_2$—CH$_2$—O—CH$_3$ | 1 |
| 186 | —SO$_2$—CH$_2$—CH$_2$—O—CH$_2$—CH$_2$—O—CH$_2$—CH$_2$—OH | 1 |
| 187 | —CO$_2$—CH$_2$—CH(CH$_2$CH$_3$)—CH$_2$—CH$_2$—CH$_2$CH$_3$ | 1 |
| 188 | —CO$_2$—CH$_2$—CH$_2$—O—CH$_2$—CH$_2$—O—CH$_3$ | 1 |
| 189 | —SO$_2$—NH—CH$_2$—CH(CH$_2$CH$_3$)—CH$_2$—CH$_2$—CH$_2$—CH$_3$ | 1 |
| 190 | —CO—NH—CH$_2$—CH$_2$—O—CH$_2$—CH$_2$—O—CH$_3$ | 1 |

The structure of the phthalocyanine compound represented by M-Pc(X$_{p1}$)$_m$(X$_{p2}$)$_n$ in Tables above is shown below:

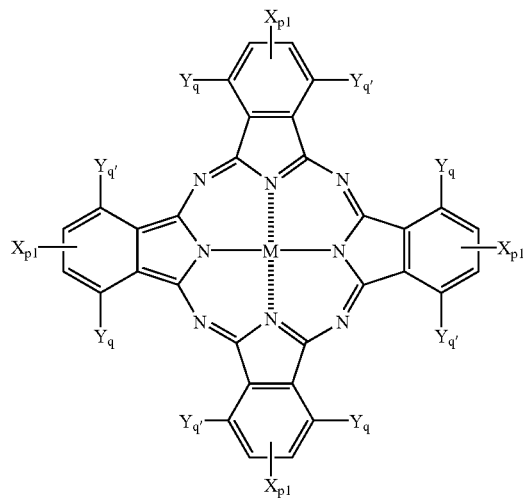

(wherein each X$_{p1}$ is independently X$_{p1}$ or X$_{p2}$).

The phthalocyanine dye represented by formula (I) can be synthesized according to the patent publications described above. Furthermore, the phthalocyanine dye represented by formula (II) can be synthesized by, in addition to the synthesis method described above, the methods described in JP-A-2001-226275, JP-A-2001-96610, JP-A-2001-47013 and JP-A-2001-193638. The starting materials, dye intermediate and synthesis route are not limited to those described in these patent publications.

The ink for ink jet recording, which is used in the present invention (hereinafter sometimes referred to as the ink of the present invention), contains the above-described phthalocyanine dye in an amount of preferably from 0.2 to 20 mass %, more preferably from 0.5 to 15 mass %.

The phthalocyanine dye is characterized in that the molecular absorption coefficient is high and a high density can be obtained with an equivalent amount.

In combination with the azo dye represented by formula (1) or the phthalocyanine dye represented by formula (I), other dyes may be used in the ink of the present invention so as to adjust the color tone for obtaining a full color image. Examples of the dye which can be used in combination include the followings.

Examples of the yellow dye include aryl- or heterylazo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro-nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the magenta dye include aryl- or heterylazo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo.thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

A black dye such as polyazo dye can also be used.

Examples of the water-soluble dye include a direct dye, an acid dye, a food color, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

As the pigment (including those called dyestuff) for use in the present invention, commercially available pigments and known pigments described in various publications can be used. The publication includes *Color Index*, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the organic pigment include azo pigments (e.g., azo lake pigment, insoluble azo pigment, condensed azo pigment, chelate azo pigment), polycyclic pigments (e.g., phthalocyanine-base pigment, anthraquinone-base pigment, perylene-base and perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments. Specific examples of the inorganic pigment include yellow pigments such as C.I. Pigment Yellow 34, 37, 42 and 53, red-base pigments such as C.I. Pigment Red 101 and 108, blue-base pigments such as C.I. Pigment Blue 27, 29 and 17:1, black-base pigments such as C.I. Pigment Black 7 and magnetite, and white-base pigments such as C.I. Pigment White 4, 6, 18 and 21.

The pigments having a preferred color tone for the formation of an image include the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment 93, 94, 95, 128 and 155, benzimidazolone-type C.I. Pigment Yellow 120, 151, 154, 156 and 180, and among these, those not using a benzidine-base compound as a raw material are more preferred), isoindoline-isoindolinone-base pigments (preferred examples thereof include C.I. Pigment Yellow 109, 110, 137 and 139,), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The pigment which can be used in the present invention may be the above-described pigment as it is or a pigment after the surface treatment. For the surface treatment, a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitsu to Oyo* (*Properties and Applications of Metal Soap*), Saiwai Shobo;

(2) *Insatsu Ink Insatsu* (*Printing Ink Printing*), CMC Shuppan (1984);

(3) *Saishin Ganryo Oyo Gijutsu* (*Newest Pigment Application Technology*), CMC Shuppan (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. Patents of (4) and capsulated pigments prepared by the method described in Japanese Patent Publications of (5) are effective because dispersion stability can be obtained without using an excess dispersant in the ink.

In the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the present invention is, after the dispersion, preferably from 0.01 to 10 μm, more preferably from 0.05 to 1 μm.

As for the method of dispersing the pigment, known dispersion techniques used at the production of ink or toner can be used. Examples of the dispersing machine include vertical or horizontal agitator mill, attritor, colloid mill, ball mill, three-roll mill, bar mill, super-mill, impeller, disperser, KD mill, dynatron and pressure kneader. These are described in detail in *Saishin Ganryo Oyo Gijutsu* (*Newest Pigment Application Technology*), CMC Shuppan (1986).

The azo dye and phthalocyanine dye for use in the present invention are substantially soluble or dispersible in water. A water-soluble dye where the solubility of the dye represented by formula (1) or (I) in water at 20° C. is preferably 2 mass % or more, more preferably 5 mass % or more, is preferred. In the case of using the phthalocyanine dye, the solubility of the dye in water at 20° C. is preferably 2 mass % or more.

The ink for use in the present invention is characterized by having a conductivity of 0.01 to 10 S/m. The conductivity is preferably from 0.05 to 5 S/m.

The conductivity can be measured by the electrode method using a commercially available saturated potassium chloride.

The conductivity can be controlled mainly by the ion concentration in an aqueous solution. In the case where the salt concentration is high, desalting can be performed using ultrafiltration membrane or the like. Also, in the case of controlling the conductivity by adding a salt or the like, the conductivity can be controlled by adding various organic or inorganic salts.

Examples of the inorganic salt which can be used include inorganic compounds such as potassium halide, sodium halide, sodium sulfate, potassium sulfate, sodium hydrogen sulfate, potassium hydrogen sulfate, sodium nitrate, potassium nitrate, sodium hydrogencarbonate, potassium hydrogencarbonate, sodium phosphate, sodium monohydrogenphosphate, boric acid, potassium dihydrogen-phosphate and sodium dihydrogenphosphate. Also, organic compounds such as sodium acetate, potassium acetate, potassium tartrate, sodium tartrate, sodium benzoate, potassium benzoate, sodium p-toluenesulfonate, potassium saccharinate, potassium phthalate and sodium picolinate can be used.

The conductivity can also be controlled by selecting the components of the aqueous medium which is described later.

The surfactant which can be contained in the ink for ink jet recording of the present invention is described below.

When a surfactant is incorporated into the ink for ink jet recording of the present invention to thereby control the liquid properties of the ink, this provides excellent effects such as improvement in the ejection stability of ink, elevation of the water resistance of image and prevention of the blurring of printed ink.

Examples of the surfactant include anionic surfactants such as sodium dodecylsulfate, sodium dodecyloxysulfonate and sodium alkylbenzenesulfonate, cationic surfactants such as cetyl pyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 mass %, preferably from 0.005 to 10 mass %, more preferably from 0.01 to 5 mass %, based on the ink.

The ink for ink jet recording of the present invention can be prepared by dissolving and/or dispersing the above-described azo or phthalocyanine dye and surfactant in an aqueous medium. The term "aqueous medium" as used in the present invention means water or a mixture of water and a slight amount of water-miscible organic solvent, where additives such as wetting agent, stabilizer and antiseptic are added, if desired.

In preparing the ink solution of the present invention, in the case of a water-soluble ink, the dye is preferably first dissolved in water. Thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various methods known in the art can be used, such as flow stirring and stirring utilizing the shearing force by means of a reversal agitator or a dissolver. Also, a stirring method utilizing the shearing force with the bottom surface of a container, such as magnetic stirrer, can be advantageously used.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol, monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the case where the above-described azo dye and phthalocyanine dye are an oil-soluble dye, the ink solution can be prepared by dissolving the oil-soluble dye in a high boiling point organic solvent and emulsification-dispersing it in an aqueous medium.

The high boiling point organic solvent for use in the present invention preferably has a boiling point of 150° C. or more, more preferably 170° C. or more.

Examples of the high boiling point organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenyl, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedanoic acid), alkylphosphoric acids (e.g., di-(2-ethylhexyl)phosphoric acid and diphenylphosphoric acid).

The high boiling point organic solvent can be used in an amount of, in terms of the mass ratio to the oil-soluble dye, from 0.01 to 3 times, preferably from 0.01 to 1.0 times.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly (N-tert-butylacrylamide)].

Examples of the high boiling point organic solvent for use in the present invention, other than the above-described compounds, and the synthesis method of these high boiling organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

In the present invention, the oil-soluble dye or high boiling point organic solvent is used by emulsification-dispersing it in an aqueous medium. At the emulsification-dispersion, a low boiling point organic solvent may be used in combination depending on the case from the viewpoint of emulsifiability. The low boiling point organic solvent which can be used in combination is an organic solvent having a boiling point of about 30° C. to 150° C. at atmospheric pressure. Preferred examples thereof include esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofurane, dioxane), however, the present invention is not limited thereto.

In the emulsification dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, however, a so-called phase inversion emulsification method of adding dropwise an aqueous phase in an oil phase can also be preferably used.

In performing the emulsification dispersion of the present invention, various surfactants can be used. Preferred examples thereof include anionic surfactants such as fatty acid salt, alkylsulfuric ester salt, alkylbenzene-sulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be used.

The surfactant used for the emulsification has a purpose different from that of the above-described surfactant added for adjusting the liquid properties of the ink for ink jet recording but the same surfactant can be used and the surfactant used can result in implementing the function of adjusting the properties of ink.

For the purpose of stabilizing the dispersion immediately after the emulsification, a water-soluble polymer may also be added in combination with the surfactant. As the water-soluble polymer, polyvinyl alcohol, polyvinylpyrrolidone, polyethylene oxide, polyacrylic acid, polyacrylamide, and copolymers thereof are preferably used. In addition, natural water-soluble polymers such as polysaccharides, casein and gelatin are also preferably used.

Furthermore, for the stabilization of the dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers and acrylonitriles, can also be used in combination. This polymer preferably contains $—SO_3^-$ or $—COO^-$. In the case of using this polymer which does not substantially dissolve in an aqueous medium, the polymer is preferably used in an amount of 20 mass % or less, more preferably 10 mass % or less, based on the high boiling point organic solvent.

In preparing an aqueous ink by dispersing an oil-soluble dye in a high boiling point organic solvent according to the emulsification dispersion, control of the particle size is important. In order to elevate the color purity or density of an image formed by the ink jetting, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417–418.

For example, the ink solution is diluted with distilled water such that the particle concentration in the ink becomes from 0.1 to 1 mass %, then, the particle size can be easily measured by a commercially available volume average particle size measuring apparatus (for example, Microtrac UPA, manufactured by Nikkiso K.K.). The dynamic light scattering method utilizing the laser Doppler effect is particularly preferred because the particle size can be measured even in the case of particles having a small size.

The volume average particle size is an average particle size weighted with the particle volume and is obtained by multiplying the diameter of individual particles in the gathering of particles with the volume of the particle and dividing the sum total of the values obtained by the total volume of the particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about failure or slippage in the ejection of ink and the printing performance is seriously affected by this. In order to prevent these troubles, it is important that when an ink is prepared, the number of particles having a particle size of 5 μm or more and the number of particles having a particle size of 1 μm or more are reduced to 10 or less and 100 or less, respectively, in 1 μl of ink.

For removing these coarse particles, a known method such as centrifugal separation or microfiltration can be used. This separation step may be performed immediately after the emulsification dispersion or may be performed immediately before the filling in an ink cartridge after various additives such as wetting agent and surfactant are added to the emulsified dispersion.

A mechanically emulsifying apparatus is effective for reducing the average particle size and eliminating coarse particles.

As the emulsifying apparatus, known apparatuses such as simple stirrer, impeller stirring system, in-line stirring system, mill system such as colloid mill, and ultrasonic system can be used, however, a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A. P. V Gaulin Inc.), Microfluidizer (manufactured by Microfluidex Inc.) and Altimizer (produced by Sugino Machine).

The recent high-pressure homogenizer with a mechanism of pulverizing particles in an ultrahigh pressure jet stream described in U.S. Pat. No. 5,720,551 is particularly effective for the emulsification dispersion of the present invention. Examples of the emulsifying apparatus using this ultrahigh pressure jet stream include DeBEE2000 (manufactured by BEE International Ltd.).

In performing the emulsification by a high-pressure emulsification dispersing apparatus, the pressure is 50 MPa or more, preferably 60 MPa or more, more preferably 180 MPa or more.

A method of using two or more emulsifying apparatuses, for example, emulsification in a stirring emulsifier and then passing through a high-pressure homogenizer, is particularly preferred. Also, a method of once emulsification dispersing the dye solution by such an emulsifying apparatus, adding additives such as wetting agent and surfactant, and then again passing the dispersion through a high-pressure homogenizer during the time of filling the ink into a cartridge is preferred.

In the case of containing a low boiling point organic solvent in addition to a high boiling point organic solvent, the low boiling point solvent is preferably removed in view of stability of the emulsified product, safety and hygiene.

For removing the low boiling point solvent, various known methods can be used according to the kind of solvent. Examples of the method include evaporation, vacuum evaporation and ultrafiltration. This removal of the low boiling point organic solvent is preferably performed as soon as possible immediately after the emulsification.

The preparation method of the ink for ink jetting is described in detail in JP-A-5-148436, JP-A-5-295312, JP-A-7-97541, JP-A-7-82515 and JP-A-7-118584 and those described can be utilized also in the preparation of ink for ink jet recording of the present invention.

In the ink for ink jet recording obtained by the present invention, additives such as drying inhibitor for preventing clogging due to drying of ink at the ejection port, permeation accelerator for attaining more successful permeation of ink into paper, ultraviolet absorbent, antioxidant, viscosity controlling agent, surface tension adjusting agent, dispersant, dispersion stabilizer, fungicide, rust inhibitor, pH adjusting agent, defoaming agent and chelating agent can be appropriately selected and used in an appropriate amount.

The drying inhibitor for use in the present invention is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 mass %.

Examples of the permeation accelerator for use in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 mass % of the permeation accelerator to the ink. The permeation accelerator is preferably used within the amount range of causing no blurring of printed letter or no print through.

The ultraviolet absorbent is used for improving the preservability of image. Examples of the ultraviolet absorbent which can be used in the present invention include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure No. 24239, and compounds of absorbing ultraviolet light and emitting fluorescent light, so-called fluorescent brightening agents represented by stilbene-base compound and benzoxazole-base compound.

As the antioxidant used for improving the preservability of image in the present invention, various organic discoloration inhibitors and metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in Research Disclosure, Nos. 17643 (Items VII-I to VII-J), 15162, 18716 (page 650, left column) 36544 (page 527), 307105 (page 872) and 15162, and compounds included in formulae of representative compounds and in exemplary compounds described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 5.00 mass %.

These are described in detail in Bokin Bobai Zai Jiten (Dictionary of Microbicide and Fungicide), compiled by Nippon Bokin Bobai Gakkai Jiten Henshu Iinkai.

Examples of the rust inhibitor include acidic sulfite, sodium thiosulfate, ammon thioglycolate, diisopropylammonium nitrite, pentaerythritol tetranitrate, dicyclohexylammonium nitrite and benzotriazole. The rust inhibitor is preferably used in the ink in an amount of 0.02 to 5.00 mass %.

The pH adjusting agent for use in the present invention is suitably used for adjusting the pH and imparting dispersion stability. The pH of the ink is preferably adjusted to 8 to 11 at 25° C. If the pH is less than 8, the solubility of dye decreases to readily cause clogging of a nozzle, whereas if it exceeds 11, the water resistance is liable to deteriorate. Examples of the pH adjusting agent include, as basic one, organic bases and inorganic alkalis, and as acidic one, organic acids and inorganic acids.

Examples of the organic base include triethanolamine, diethanolamine, N-methyldiethanolamine and dimethylethanolamine. Examples of the inorganic alkali include hydroxides of alkali metal, such as sodium hydroxide, lithium hydroxide and potassium hydroxide; carbonates of alkali metal, such as sodium carbonate and sodium hydrogen-carbonate; and ammonium. Examples of the organic acid include acetic acid, propionic acid, trifluoroacetic acid and alkylsulfonic acid. Examples of the inorganic acid include hydrochloric acid, sulfuric acid and phosphoric acid.

In the present invention, apart from the above-described surfactant, a nonionic, cationic or anionic surfactant is used as the surface tension adjusting agent. Examples of the anionic surfactant include fatty acid salt, alkylsulfuric ester salt, alkylbenzenesulfonate, alkylnaphthalenesulfonate, dialkylsulfosuccinate, alkyl-phosphoric ester salt, naphthalenesulfonic acid formalin condensate and polyoxyethylene-alkylsulfuric ester salt. Examples of the nonionic surfactant include polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (198n) can be used.

By using or not using such a surface tension adjusting agent, the surface tension of the ink for use in the present invention is preferably from 20 to 60 mN/m, more preferably from 25 to 45 mN/m.

The viscosity of the ink for use in the present invention is preferably 30 mPa·s or less, more preferably 20 mPa·s or less. For the purpose of controlling the viscosity, a viscosity controlling agent is sometimes used. Examples of the viscosity controlling agent include celluloses, water-soluble polymers such as polyvinyl alcohol, and nonionic surfactants. These are described in detail in *Nendo Chosei Gijutsu (Viscosity Controlling Technology)*, Chap. 9, Gijutsu Joho Kyokai (1999), and *Ink Jet Printer Yo Chemicals (98 Zoho)—Zairyo no Kaihatsu Doko.Tenbo Chosa—(Chemicals for Ink Jet Printer (Enlarged Edition of 98)—Survey on Tendency.Prospect of Development of Materials—)*, pp. 162–174, CMC (1997).

Also, in the present invention, the above-described various cationic, anionic nonionic surfactants can be used as the dispersant or dispersion stabilizer and if desired, fluorine-base or silicone-base compounds, chelating agents represented by EDTA, and the like can be used as the defoaming agent.

At the preparation of the ink composition of the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various methods known in the art can be used, such as flow stirring and stirring utilizing the shearing force by means of a reversal agitator or a dissolver. Also, a stirring method utilizing the shearing force with the bottom surface of a container, such as magnetic stirrer, can be advantageously used.

The recording material (preferably recording paper and recording film) for use in the present invention is described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP by mixing, if desired, conventionally known additives such as pigment, binder, sizing agent, fixing agent, cation agent and paper strength increasing agent and then sheeting the mixture using various devices such as Fourdrinier paper machine and cylinder paper machine. Other than this support, synthetic paper or plastic film may be used. Th thickness of the support is preferably from 10 to 250 μm and the basis weight is preferably from 10 to 250 g/m².

The image-receiving material for the ink of the present invention may be obtained by providing an image-receiving layer and a backcoat layer on the support as it is or by forming a size press or anchor coat layer using starch, polyvinyl alcohol and the like and then providing an image-receiving layer and a backcoat layer. The support may also be subjected to a flattening treatment by a calendering device such as machine calender, TG calender and soft calender.

In the present invention, the support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. The image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production method (gas phase method) or a silicic acid hydrate obtained by a wet production method.

Specific examples of the recording paper containing the pigment in the image-receiving layer include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2002-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carbox-ymethyl cellulose, hydroxyethyl cellulose, polyvinylpyrrolidone, polyalkylene oxide and polyalkylene oxide derivatives, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and peeling resistance of the ink-accepting layer.

The image-receiving layer may contain a mordant, a water-proofing agent, a light fastness enhancer, a gas resistance enhancer, a surfactant, a hardening agent and other additives in addition to the pigment and the aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride and cation polyacrylamide. The content of the cationic resin is preferably from 1 to 15 mass %, more preferably from 3 to 10 mass %, based on the entire solid content of the ink-accepting layer.

Examples of the light fastness enhancer and the gas resistance enhancer include phenol compounds, hindered phenol compounds, thioether compounds, thiourea compound thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids and benzotriazole compounds.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate and magnesium hydroxide, and organic pigments such as styrene-base plastic pigment, acrylic plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other components contained in the backcoat layer include a defoaming agent, a foam inhibitor, a dye, a fluorescent brightening agent, an antiseptic, a water-proofing agent and the like.

A polymer fine particle dispersion may be added to a constituent layer (including the back layer) of the ink jet recording paper or film. The polymer fine particle dispersion is used for the purpose of improving film properties, for example, stabilizing the dimension and preventing the curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. Also by adding a polymer fine particle dispersion having a high glass transition temperature to the back layer, curling can be prevented.

The ink for ink jet recording used in the present invention can be used for uses other than the ink jet recording, for example, a material for display image, an image-forming material for interior decoration and an image-forming material for outdoor decoration.

Examples of the material for display image include various materials such as poster, wall paper, ornamental goods (e.g., ornament, doll), handbill for commercial advertisement, wrapping paper, wrapping material, paper bag, vinyl bag, package material, billboard, image drawn or attached to the side face of traffic (e.g., automobile, bus, electric car), and clothes with a logo. In the case of using the dye of the present invention as a material for forming a display image, the image includes, in addition to a strict image, all patterns by a dye, which can be acknowledged by a human, such as abstract design, letter and geometrical pattern.

Examples of the interior decoration include various materials such as wall paper, ornamental goods (e.g., ornament, doll), member of luminaire, member of furniture and design member of floor or ceiling. In the case of using the dye of the present invention as a material for forming an image, the image includes, in addition to a strict image, all patterns by a dye, which can be acknowledged by a human, such as abstract design, letter and geometrical pattern.

Examples of the outdoor decoration include various materials such as wall material, roofing material, billboard, gardening material, outdoor ornamental goods (e.g., ornament, doll), and member of outdoor luminaire. In the case of using the dye of the present invention as a material for forming an image, the image includes, in addition to a strict image, all patterns by a dye, which can be acknowledged by a human, such as abstract design, letter and geometrical pattern.

In these uses, examples of the medium where the pattern is formed include various materials such as paper, fiber, cloth (including non-woven fabric), plastic, metal and ceramic. Examples of the dyeing form include mordanting, printing and fixing of a dye in the form of a reactive dyestuff having introduced thereinto a reactive group. Among these, preferred is dyeing by mordanting.

EXAMPLES

The present invention is described below by referring to Examples, however, the present invention is not limited thereto.

Example I-1

Prints obtained using a magenta ink shown below by varying the hitting volume were examined on the roughness according to subjective evaluation.

Preparation of Magenta Ink:

Deionized water was added to the following components to make 1 liter and the mixture was stirred for 1 hour while heating at 30 to 40° C. Thereafter, the solution was filtered under reduced pressure through a microfilter having an average pore size of 0.25 μm to prepare a magenta ink.

| [Formulation of Magenta Ink] | |
|---|---|
| (Solid Contents) | |
| Magenta dye (a-36) | 23 g/liter |
| PROXEL | 5 g/liter |
| (Liquid Components) | |
| Diethylene glycol | 90 g/liter |
| Glycerin | 70 g/liter |
| Triethylene glycol monobutyl ether | 70 g/liter |
| Triethanolamine | 6.9 g/liter |
| SURFINOL STG | 10 g/liter |
| Glycerin | 50 g/liter |

The obtained ink was filled into a magenta ink cartridge of an ink jet printer PM-950C manufactured by EPSON and for other colors, inks of PM-950C were used to print a magenta monochromatic image. The image-receiving sheet used was an ink jet paper photo gloss paper EX produced by Fuji Photo Film Co., Ltd. and a magenta monochromatic image was printed on the image sheet while varying the hitting volume as shown in Table I-1 by controlling the voltage waveform for driving the piezo head of PM-950C.

(Evaluation)

The roughness of print was examined by the subjective evaluation of the following A to D.

A: Out of 10 persons, 9 or more persons perceive no roughness.

B: Out of 10 persons, 7 or more persons perceive no roughness.

C: Out of 10 persons, 5 or more persons perceive no roughness.

D: Out of 10 persons, 3 or more persons perceive no roughness.

TABLE I-1

| Hitting Size | Evaluation of Roughness |
|---|---|
| 2 pl | A |
| 5 pl | A |
| 10 pl | B |
| 20 pl | B |
| 50 pl | C |
| 100 pl | D |

As Comparative Example, an image recorded with an ink droplet of 200 pl using an experimental apparatus was evaluated, as a result, 10 persons all perceived roughness.

It is seen from these results that as the hitting volume is smaller, the roughness is more reduced.

As such, the roughness can be made small by reducing the minimum hitting volume.

Here, the ink of the present invention is characterized by having a high $\epsilon$, namely, a high concentration and even in the recording with the same hitting size, high-density recording can be attained.

A same image was recorded using the ink of the present invention or a commercially available ink (magenta ink for PM950, produced by Epson) by hitting each ink on a recording paper based on the same image signals and the density in the portion with a hitting density of giving an equivalent pressure was measured using a densitometer manufactured by X-Rite. The results were compared, as a result, the density was 1.3 in the case of ink for use in the present invention and 1.0 in the case of the commercially available ink.

As such, high-density recording can be attained with an ink having the same volume and therefore, by combining the driving control with the ink of the present invention, an image reduced in the roughness and having the same density can be recorded with small-volume ink droplets.

Incidentally, in order to record an image with the same density, as the hitting size is smaller, the amount of ink droplets hit on the recording paper per hour is more reduced and therefore, the recording time is prolonged. Thus, the amount of ink supplied to the recording paper acts as a constraint and therefore, the recording time is determined by the hitting size. In the case of mass-printing a photograph or the like, the recording time is preferably shortened and when the hitting size is increased to 500 pl, the recording time can be shortened but in view of the image quality, the roughness becomes worse.

By using the ink of the present invention, an image reduced in the roughness and having the same density can be obtained with small-volume ink droplets.

According to the present invention, a high-density image reduced in the roughness can be obtained by the ink jet recording.

TABLE II-1

Using the magenta ink shown below, the driving frequency and the printing time for obtaining an L-size print of a photograph were examined.

When 500 nozzles of a 89 mm-width head having about 2,000 nozzles were simultaneously driven for printing an L-size print of a photograph in a high productivity, the one-line four-time driving had to be repeated to a 3,000-line portion for printing a length of 127 mm. When driven at 1 KHz, printing of one sheet took 12 seconds. That is, 300 sheets could be printed in one hour. One sheet could be recorded in 2.4 seconds at 5 KHz and in 1.2 seconds at 10 KHz.

When the hitting frequency was set to 10 KHz, the head was driven every 100 micro-seconds and one-line recording was completed in 400 micro-seconds. When the travelling speed of the recording paper was set such that the recording paper moves 1/600 inch, namely, about 42 micron per 400 micro-seconds, the printing could be performed at a speed of one sheet per 1.2 seconds.

Preparation of Magenta Ink:

Deionized water was added to the following components to make 1 liter and the mixture was stirred for 1 hour while heating at 30 to 40° C. Thereafter, the solution was filtered under reduced pressure through a microfilter having an average pore size of 0.25 μm to prepare a magenta ink.

| [Formulation of Magenta Ink] | |
|---|---|
| (Solid Contents) | |
| Magenta dye (a-36) | 23 g/liter |
| PROXEL | 5 g/liter |
| (Liquid Components) | |
| Diethylene glycol | 90 g/liter |
| Glycerin | 70 g/liter |
| Triethylene glycol monobutyl ether | 70 g/liter |
| Triethanolamine | 6.9 g/liter |
| SURFINOL STG | 10 g/liter |
| Glycerin | 50 g/liter |

The obtained ink was filled into a magenta ink cartridge of an ink jet printer PM-950C manufactured by EPSON and for other colors, inks of PM-950C were used to print a magenta monochromatic image on an image-receiving sheet which was an ink jet paper photo gloss paper EX produced by Fuji Photo Film Co., Ltd., while varying the driving frequency and the printing time.

Here, the ink of the present invention is characterized by having a high $\epsilon$, namely, a high concentration and even in the recording with the same hitting size, high-density recording can be attained.

A same image was recorded using the ink of the present invention or a commercially available ink (magenta ink for PM950, produced by Epson) by hitting each ink on a recording paper based on the same image signals and the density in a specific portion was compared, as a result, the density was 1.3 in the case of ink for use in the present invention and 1.0 in the case of the commercially available ink. As such, the ink for use in the present invention enables high-density recording with an ink having the same volume and therefore, a sufficiently high density as a photograph can be obtained by once hitting at a recording density of 600 dpi.

As verified above, by ejecting an ink having a high concentration (preferably having a recording density of 600 dpi) at a high driving frequency (preferably 1 KHz or more), a print with excellent image quality can be obtained in a high productivity.

According to the present invention, a method and an apparatus for ink jet recording where a high-quality image can be recorded at a high speed are provided.

Example III-1

Using a magenta ink shown below, the relationship between the average hitting speed of ink and the roughness of image was examined by subjective evaluation.

Preparation of Magenta Ink:

Deionized water was added to the following components to make 1 liter and the mixture was stirred for 1 hour while heating at 30 to 40° C. Thereafter, the solution was filtered under reduced pressure through a microfilter having an average pore size of 0.25 µm to prepare a magenta ink.

| [Formulation of Magenta Ink] | |
| --- | --- |
| (Solid Contents) | |
| Magenta dye (a-36) | 23 g/liter |
| PROXEL | 5 g/liter |
| (Liquid Components) | |
| Diethylene glycol | 90 g/liter |
| Glycerin | 70 g/liter |
| Triethylene glycol monobutyl ether | 70 g/liter |
| Triethanolamine | 6.9 g/liter |
| SURFINOL STG | 10 g/liter |
| Glycerin | 50 g/liter |

The obtained ink was filled into a magenta ink cartridge of an ink jet printer PM-950C manufactured by EPSON and for other colors, inks of PM-950C were used to print a magenta monochromatic image. The image-receiving sheet used was an ink jet paper photo gloss paper EX produced by Fuji Photo Film Co., Ltd. and a magenta monochromatic image was printed on the image sheet while varying the average hitting speed as shown in Table III-1.

The image used in this experiment was a portrait image where unevenness and roughness are most easily perceived. The hitting speed was changed by varying the viscosity of ink and adjusted to give a hitting size of about 10 pl. Thereafter, the recording image was examined on the roughness by subject evaluation.

(Evaluation)

The subjective evaluation of the following A to E was performed.

A: Out of 10 persons, 9 or more persons perceive no roughness.

B: Out of 10 persons, 7 or more persons perceive no roughness.

C: Out of 10 persons, 5 or more persons perceive no roughness.

D: Out of 10 persons, 3 or more persons perceive no roughness.

E: All of 10 persons perceive roughness.

The evaluation results are shown in Table III-1.

TABLE III-1

| Hitting Speed | Evaluation of Roughness |
| --- | --- |
| 1 m/sec | E |
| 2 m/sec | D |
| 3 m/sec | B |
| 4 m/sec | B |
| 5 m/sec | A |
| 10 m/sec | A |

Example III-2

FIG. 4 is a graph showing the fluctuation in the landing position based on the volume of ink droplet when the ink is hit at a speed of 2 m/sec.

Example III-3

FIG. 5 shows the fluctuation in the landing position when the ink is hit in a volume of 2 pl and the speed is changed.

Example III-4

Using three kinds of ink droplet volumes, namely, 2 pl, 5 pl and 10 pl, printing was performed by hitting the ink at a speed of 10 m/sec for the ink droplet in 2 pl, 8 m/sec for 5 pl, and 5 m/sec for 10 pl. The perceivability of unevenness was 20% (2 persons out of 10 persons perceived the roughness).

It is seen from Examples III-1 and III-3 that when the hitting speed is lowered, the dispersion in the landing position of ink droplet on the recording paper increases and thereby, the roughness of image increases.

By hitting the ink at a high speed, a good image can be recorded even when a high-concentration ink is hit in a small size.

As such, when the ink composition of the present invention is used and the average hitting speed is satisfied, an image excellent in the weather resistance and reduced in the roughness can be recorded and a great effect is exerted particularly in printing a photograph by the ink jetting.

According to the present invention, a high-density image reduced in the roughness can be obtained by the ink jet recording.

Example IV-1

(Preparation of Ink Solution)

Deionized water was added to the following components to make 1 liter and the mixture was stirred for 1 hour while heating at 30 to 40° C. Thereafter, the solution was filtered under reduced pressure through a microfilter having an average pore size of 0.25 µm to prepare a light cyan ink solution.

| (Components of Light Cyan Ink Solution) | |
| --- | --- |
| -Solid Contents- | |
| Cyan dye [Compound No. 154] | 17.5 g/liter |
| PROXEL XL2 (produced by Zeneka) | 5 g/liter |

-continued

| (Components of Light Cyan Ink Solution) | |
|---|---|
| -Liquid Components- | |
| Diethylene glycol (DEG) | 90 g/liter |
| Glycerin (GR) | 50 g/liter |
| Triethylene glycol monobutyl ether (TGB) | 70 g/liter |
| Triethanolamine | 6.9 g/liter |
| SURFINOL STG | 10 g/liter |

Also, a cyan ink solution was prepared according to the above-described formulation by increasing the amount of the cyan dye [Compound No. 154] to 68 g/liter.

| (Components of Cyan Ink Solution) | |
|---|---|
| -Solid Contents- | |
| Cyan dye [Compound No. 154] | 68 g/liter |
| PROXEL XL2 (produced by Zeneka] | 5 g/liter |
| -Liquid Components- | |
| Diethylene glycol (DEG) | 90 g/liter |
| Glycerin (GR) | 50 g/liter |
| Triethylene glycol monobutyl ether (TGB) | 70 g/liter |
| Triethanolamine | 6.9 g/liter |
| SURFINOL STG | 10 g/liter |

These inks were filled into a cyan•light cyan ink cartridge of an ink jet printer PM-950C manufactured by EPSON and for other colors, inks of PM-950C were used to print a cyan monochromatic image on an image-receiving sheet which was an ink jet paper photo gloss paper EX produced by Fuji Photo Film Co., Ltd., while changing the hitting volume as shown in Table 12 by controlling the voltage waveform for driving the piezo head of PM950C.

The roughness (visual smoothness of image) of the printed image was examined by the following subjective evaluation.

A: Out of 10 persons, 9 or more persons perceive no roughness.

B: Out of 10 persons, 7 or more persons perceive no roughness.

C: Out of 10 persons, 5 or more persons perceive no roughness.

D: Out of 10 persons, 3 or more persons perceive no roughness.

TABLE 12

| Hitting Size | Evaluation of Roughness |
|---|---|
| 2 pl | A |
| 5 pl | A |
| 10 pl | B |
| 20 pl | B |
| 50 pl | C |
| 100 pl | D |

As Comparative Example, an image recorded with an ink droplet of 200 pl using an experimental apparatus was evaluated, as a result, 10 persons all perceived roughness.

It is seen from these results that as the hitting volume is smaller, the roughness is more reduced. As such, the roughness can be made small by reducing the minimum hitting volume.

Here, the ink for use in the present invention is characterized by having a high concentration and even in the recording with the same hitting size, high-density recording can be attained. For example, a same image was recorded using the ink for use in the present invention or a commercially available ink (light cyan ink, cyan ink for PM950, produced by Epson) by hitting each ink on a recording paper based on the same image signals and the density in the portion with the same hitting density was measured using a densitometer manufactured by X-Rite. The results are shown below.

| Ink of the Present Invention | Commercially Available Ink |
|---|---|
| 1.3 | 1.0 |

As such, high-density recording can be attained with an ink having the same volume and therefore, by combining the driving control with the ink of the present invention, an image reduced in the roughness and having the same density can be recorded with ink droplets in a small hitting volume.

Incidentally, in order to record an image with the same density, as the hitting size is smaller, the amount of ink droplets hit on the recording paper per hour is more reduced and therefore, the recording time is prolonged. Thus, when the hitting speed and the hitting frequency are the same, the amount of ink supplied to the recording paper acts as a constraint and therefore, the recording time is determined by the hitting size.

In the case of mass-printing a photograph or the like, the recording time is preferably shortened and when the hitting size is increased to 500 pl, the recording time can be shortened but in view of the image quality, the roughness becomes worse.

In the present invention, despite the small hitting volume, an ink droplet having a high concentration can be hit, so that an image reduced in the roughness and satisfied in the density can be obtained without excessively prolonging the recording time.

According to the present invention, a high-density image reduced in the roughness and free of defects in the image quality can be obtained.

Example V-1

(Preparation of Ink Solution)

Deionized water was added to the following components to make 1 liter and the mixture was stirred for 1 hour while heating at 30 to 40° C. Thereafter, the solution was filtered under reduced pressure through a microfilter having an average pore size of 0.25 µm to prepare a light cyan ink solution.

| (Components of Light Cyan Ink Solution) | |
|---|---|
| -Solid Contents- | |
| Cyan dye [Compound No. 154] | 17.5 g/liter |
| PROXEL XL2 (produced by Zeneka] | 5 g/liter |

(Components of Light Cyan Ink Solution)

-Liquid Components-

| | |
|---|---|
| Diethylene glycol (DEG) | 90 g/liter |
| Glycerin (GR) | 50 g/liter |
| Triethylene glycol monobutyl ether (TGB) | 70 g/liter |
| Triethanolamine | 6.9 g/liter |
| SURFINOL STG | 10 g/liter |

Also, a cyan ink solution was prepared according to the above-described formulation by increasing the amount of the cyan dye [Compound No. 154] to 68 g/liter.

(Components of Cyan Ink Solution)

-Solid Contents-

| | |
|---|---|
| Cyan dye [Compound No. 154] | 68 g/liter |
| PROXEL XL2 (produced by Zeneka] | 5 g/liter |

-Liquid Components-

| | |
|---|---|
| Diethylene glycol (DEG) | 90 g/liter |
| Glycerin (GR) | 50 g/liter |
| Triethylene glycol monobutyl ether (TGB) | 70 g/liter |
| Triethanolamine | 6.9 g/liter |
| SURFINOL STG | 10 g/liter |

These inks were filled into a cyan-light cyan ink cartridge of an ink jet printer PM-950C manufactured by EPSON and for other colors, inks of PM-950C were used to print a cyan monochromatic solid image on an image-receiving sheet which was an ink jet paper photo gloss paper EX produced by Fuji Photo Film Co., Ltd.

The ink for use in the present invention and a commercially available ink (light cyan ink, cyan ink for PM950, produced by Epson) each was hit on a recording paper based on the same image signals and the density in the portion with the same hitting density was measured by a densitometer manufactured by X-Rite, as a result, the density was 1.3 in the case of ink of the present invention and 1.0 in the case of the commercially available ink.

As such, the ink for use in the present invention can realize higher density recording than other ink having the same volume and therefore, a sufficiently high density as a photographic image can be obtained at a hitting density of 600 dpi.

In printing an image of 89 mm×127 mm (L size of photograph) by driving 500 nozzles of a head having 2,000 nozzles so as to attain the printing in a high productivity, a four-time driving per one line must be repeated to a 3,000-line portion. That is, printing of one sheet took 12 seconds when the head driving frequency, namely, hitting frequency was set to 1 kHz, 2.4 seconds at 5 kHz and 1.2 seconds at 10 kHz. In other words, the number of sheets printed per one hour is 300 at 1 kHz, 1,500 at 5 kHz, and 3,000 at 10 kHz.

When an image of the same size was printed using a commercially available ink (light cyan ink, cyan ink for PM950, produced by EPSON), the number of sheets printed per one hour was 4 at 1 kHz, 23 at 5 kHz, and 47 at 10 kHz.

Also, an image of 600 dpi was obtained using the ink of the present invention or the above-described commercially available ink at the same hitting frequency, and the image quality was compared, as a result, an image having a sufficiently high density could be recorded when the ink of the present invention was used. On the other hand, when the commercially available ink was used, a large amount of ink was necessary and the density was low.

According to the present invention, an ink having a high concentration is used and this ink is hit at a high hitting frequency, whereby a print having excellent image quality can be obtained in a high productivity.

Example VI-1

(Preparation of Ink Solution)

Deionized water was added to the following components to make 1 liter and the mixture was stirred for 1 hour while heating at 30 to 40° C. Thereafter, the solution was filtered under reduced pressure through a microfilter having an average pore size of 0.25 µm to prepare a light cyan ink solution.

(Components of Light Cyan Ink Solution)

-Solid Contents-

| | |
|---|---|
| Cyan dye [Compound No. 154] | 17.5 g/liter |
| PROXEL XL2 (produced by Zeneka] | 5 g/liter |

-Liquid Components-

| | |
|---|---|
| Diethylene glycol (DEG) | 90 g/liter |
| Glycerin (GR) | 50 g/liter |
| Triethylene glycol monobutyl ether (TGB) | 70 g/liter |
| Triethanolamine | 6.9 g/liter |
| SURFINOL STG | 10 g/liter |

Also, a cyan ink solution was prepared according to the above-described formulation by increasing the amount of the cyan dye [Compound No. 154] to 68 g/liter.

(Components of Cyan Ink Solution)

-Solid Contents-

| | |
|---|---|
| Cyan dye [Compound No. 154] | 68 g/liter |
| PROXEL XL2 (produced by Zeneka] | 5 g/liter |

-Liquid Components-

| | |
|---|---|
| Diethylene glycol (DEG) | 90 g/liter |
| Glycerin (GR) | 50 g/liter |
| Triethylene glycol monobutyl ether (TGB) | 70 g/liter |
| Triethanolamine | 6.9 g/liter |
| SURFINOL STG | 10 g/liter |

These inks were filled into a cyan-light cyan ink cartridge of an ink jet printer PM-950C manufactured by EPSON and for other colors, inks of PM-950C were used to print an image on an image-receiving sheet which was an ink jet paper photo gloss paper EX produced by Fuji Photo Film Co., Ltd. The image printed here was a portrait image where unevenness and roughness are most easily perceived.

In this Example, the voltage waveform for driving the piezo head of PM-950C was controlled to give a hitting voltage of 10 pl and at the same time, a predetermined average hitting speed.

The unevenness or roughness (visual smoothness) of the printed image was examined by the following subjective evaluation.

A: Out of 10 persons, 9 or more persons perceive no roughness.

B: Out of 10 persons, 7 or more persons perceive no roughness.

C: Out of 10 persons, 5 or more persons perceive no roughness.

D: Out of 10 persons, 3 or more persons perceive no roughness.

E: All of 10 persons perceive roughness.

TABLE 12

| Average Hitting Speed | Evaluation of Unevenness and Roughness |
|---|---|
| 1 m/sec | E |
| 2 m/sec | D |
| 3 m/sec | B |
| 4 m/sec | B |
| 5 m/sec | A |
| 10 m/sec | A |

It is seen from Table 12 that when the average hitting speed of ink decreases, the unevenness or roughness of image increases.

According to the present invention, a good image can be obtained at a high speed while reducing the unevenness or roughness of image.

While the invention has been described in detail and with reference to specific embodiments thereof, it will be apparent to one skilled in the art that various changes and modifications can be made therein without departing from the spirit and scope thereof.

This application is based on Japanese Patent application JP 2002-035420, filed Feb. 13, 2002, Japanese Patent application JP 2002-035382, filed Feb. 13, 2002, Japanese Patent application JP 2002-035419, filed Feb. 13, 2002, Japanese Patent application JP 2002-035381, filed Feb. 13, 2002, Japanese Patent application JP 2002-035473, filed Feb. 13, 2002 and Japanese Patent application JP 2002-035421, filed Feb. 13, 2002, the entire contents of those are hereby incorporated by reference, the same as if set forth at length.

What is claimed is:

1. An ink jet image recording method comprising hitting an ink composition on a recording material in condition of at least one of: a hitting volume of 0.1 to 100 pl; an ejection frequency of 1 KHz or more; and an average hitting speed of 2 m/sec or more, the ink composition comprising an aqueous medium and at least one water-soluble dye represented by the following formula (1) which is dissolved in the aqueous medium:

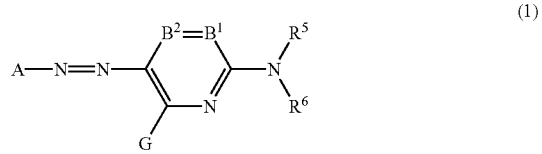

(1)

wherein A represents a 5-membered unsaturated heterocyclic group and is bonded to the azo group of formula (1) with a carbon atom; $B^1$ and $B^2$ each represents =$CR^1$— or —$CR^2$= or either one of $B^1$ and $B^2$ represents a nitrogen atom and the other represents =$CR^1$— or —$CR^2$=; $R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and hydrogen atom of each of the substituent may be substituted; G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and a hydrogen atom of each of the substituent may be substituted; $R^1$ and $R^5$, or $R^5$ and $R^6$ may combine to form a 5- or 6-membered ring; and wherein the dye has an ionic hydrophilic group as a substituent on any position of A, $R^1$, $R^2$, $R^5$, $R^6$, and G.

2. An ink jet image recording apparatus using the ink jet image recording method according to claim 1.

3. The ink jet image recording method according to claim 1, wherein when an image is recorded by mixing a plurality of ink droplets different in the hitting volume, the ink droplet in a small hitting volume is ejected at a higher hitting speed than the ink droplet in a large hitting volume.

4. The ink jet image recording method according to claim 1, wherein the hitting volume is 0.5 to 50 pl.

5. The ink jet image recording method according to claim 1, wherein the average hitting speed is 5 m/sec or more.

6. The ink jet image recording method according to claim 1, wherein A is selected from the group consisting of a pyrazole ring, an imidazole ring, a thiazole ring, an isothiazole ring, a thiadiazole ring, a benzothiazole ring, a benzoxazole ring, and a benzisothiazole ring.

7. The ink jet image recording method according to claim 1, wherein $R^1$, $R^2$, $R^5$ and $R^6$ have the same meanings as in formula (1); $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; $Z^1$ represents an electron withdrawing group having a Hammett's substituent constant σp value of 0.20 or more; $Z^2$ and Q each independently represents a hydrogen atom, an aliphatic group, an aromatic group or a heterocyclic group.

* * * * *